US007866298B2

(12) United States Patent
Shimura et al.

(10) Patent No.: US 7,866,298 B2
(45) Date of Patent: Jan. 11, 2011

(54) BUTTERFLY VALVE DEVICE

(75) Inventors: Takahiro Shimura, Mito (JP); Masashi Banse, Hitachinaka (JP); Hidefumi Iwaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 258 days.

(21) Appl. No.: 12/014,526

(22) Filed: Jan. 15, 2008

(65) Prior Publication Data

US 2008/0168965 A1 Jul. 17, 2008

(30) Foreign Application Priority Data

Jan. 16, 2007 (JP) ............................ 2007-006516

(51) Int. Cl.
*F16K 1/26* (2006.01)
*F02D 9/10* (2006.01)

(52) U.S. Cl. ...................................... 123/337; 251/305

(58) Field of Classification Search ................. 123/337; 251/368, 173, 305–307
See application file for complete search history.

(56) References Cited

U.S. PATENT DOCUMENTS

| | | | | |
|---|---|---|---|---|
| 3,921,956 | A * | 11/1975 | Hinrichs | 251/306 |
| 4,491,106 | A | 1/1985 | Morris | |
| 4,572,478 | A * | 2/1986 | Vogler et al. | 251/305 |
| 5,669,350 | A * | 9/1997 | Altmann et al. | 123/337 |
| 6,135,418 | A * | 10/2000 | Hatton | 251/306 |
| 6,138,640 | A * | 10/2000 | Asanuma et al. | 123/337 |
| 6,295,815 | B1 * | 10/2001 | Bechle et al. | 60/605.2 |

(Continued)

FOREIGN PATENT DOCUMENTS

DE 3203374 A1 * 8/1983

(Continued)

OTHER PUBLICATIONS

European Search Report dated Mar. 28, 2008 (Five (5) Pages).

*Primary Examiner*—Stephen K Cronin
*Assistant Examiner*—Arnold Castro
(74) *Attorney, Agent, or Firm*—Crowell & Moring LLP

(57) ABSTRACT

An object of the present invention is to provide a butterfly valve device made of resin, the butterfly valve device being little susceptible the secular change in gas flow (in particular, the minimum flow) or random changes.

According to the present invention, when a butterfly valve is located at a full-closed position facing a peripheral lower surface of a semicircular portion with respect to a rotating shaft of the butterfly valve made of a resin material, a partial annular projection is adapted to radially inwardly extend towards an inner wall surface of a fluid path, the partial annular projection including a plane that contacts the peripheral lower surface of the valve to form a fluid seal. Preferably, while the valve opens only by the thickness thereof from a mechanically full-closed position, from which the valve cannot mechanically rotate any more in a close direction, a surface on the periphery of the valve is formed in a curved surface shape having the specific curvature so that the specified minimum airflow is achieved at the mechanically full-closed position. In addition, cylindrical elastic sealing members are mounted around the shaft in a bearing hole, and an edge on the fluid path side of the sealing members elastically contacts an annular surface formed at a position facing the bearing hole about the rotating shaft of the valve.

23 Claims, 21 Drawing Sheets

U.S. PATENT DOCUMENTS

| | | | | |
|---|---|---|---|---|
| 6,626,421 | B2 * | 9/2003 | Torii et al. | 251/305 |
| 6,901,942 | B2 * | 6/2005 | Krimmer et al. | 137/15.25 |
| 6,908,072 | B2 * | 6/2005 | Hattori | 251/306 |
| 6,981,519 | B2 * | 1/2006 | Heckt et al. | 137/599.18 |
| 7,168,682 | B2 * | 1/2007 | Nanba et al. | 251/305 |
| 2002/0117646 | A1 * | 8/2002 | Jessberger et al. | 251/305 |
| 2003/0209682 | A1 * | 11/2003 | Jessberger et al. | 251/305 |
| 2004/0021118 | A1 * | 2/2004 | Hattori | 251/305 |
| 2004/0021119 | A1 * | 2/2004 | Hattori | 251/306 |
| 2004/0055565 | A1 * | 3/2004 | Yamamoto et al. | 123/337 |
| 2005/0109314 | A1 * | 5/2005 | Suzuki et al. | 123/337 |
| 2006/0048388 | A1 | 3/2006 | Lorenz et al. | |
| 2007/0102661 | A1 * | 5/2007 | Isogai et al. | 251/305 |
| 2009/0200505 | A1 * | 8/2009 | Elsasser et al. | 251/305 |

FOREIGN PATENT DOCUMENTS

| | | | |
|---|---|---|---|
| DE | 44 08 909 | A1 | 9/1995 |
| EP | 1 291 509 | A2 | 3/2003 |
| GB | 2 249 611 | A | 5/1992 |
| JP | 58124609 | A * | 7/1983 |
| JP | 2005-163546 | A | 6/2005 |
| JP | 2005-180423 | A | 7/2005 |
| JP | 2005-273563 | A | 10/2005 |

* cited by examiner

BUTTERFLY VALVE DEVICE

BACKGROUND OF THE INVENTION

1. Field of the Invention

The present invention relates to butterfly valve devices for controlling the gas flow, and more particularly to valve devices that are formed by resin molding. These butterfly valve devices can be applied to, for example, a throttle valve device for controlling the airflow of an internal combustion engine.

2. Description of the Related Art

For a butterfly valve used for controlling the gas flow, typified by the airflow, the formation of the butterfly valve by resin molding is proposed from the viewpoint of the weight saving, and the formability. As an example, JP-A-2005-163546, JP-A-2005-180423, and JP-A-2005-273563 disclose that a throttle valve for controlling the airflow of an internal combustion engine is formed by resin molding.

SUMMARY OF THE INVENTION

However, in the case of the butterfly valve formed by resin molding, the deformation of the valve exerts a large influence upon flow control characteristics. The deformation of the valve is caused by various kinds of external force including the heat distortion and the thermal stress, which occur due to temperature influence, or the fluid pressure that acts on the valve. As a result, the adjustment of the minimum flow of the valve becomes unstable, and the minimum flow is easily susceptible secular change.

For example, in the case of a butterfly valve used for a throttle device for controlling the airflow of an internal combustion engine, an allowable range of the minimum leakage airflow is set over an operation range from −40 degrees to +130 degrees. However, if a throttle valve made of resin is used, there arises a problem that the temperature influence causes a minute gap, which is formed in a fluid sealing member between a throttle valve and an airflow path wall surface, to change so that an allowable value is exceeded. To be more specific, when the ambient air temperature is −40 degrees, the temperature of air passing through an airflow path becomes about −10 degrees. On the other hand, the ambient air temperature (the temperature inside an engine room) around a throttle device becomes 80 degrees. At this time, the throttle valve contracts. On the other hand, although a body is cooled from the inside, the body is warmed from the outside. Accordingly, the amount of contraction is small. As a result, there is a possibility that a gap between them will be widened.

In addition, if both of a molded body and a throttle valve, which constitute an airflow path, are formed by resin molding, when the temperature decreases at the time of resin molding, if the amount of contraction of the molded body constituting part of the airflow path is large, the throttle valve is closely contacted with to the molded body, with the result that the throttle valve cannot rotate. If the gap is set at a large value beforehand to avoid the above situation, the leakage airflow becomes larger, which causes the minimum airflow to increase. In addition, the leakage airflow is easily susceptible to secular change depending on the use state.

Moreover, a gap made between a peripheral wall inside a bearing hole and an outer circumferential surface of a rotating shaft is easily susceptible to secular change. This is a bottleneck in the adjustment of the minimum flow.

Furthermore, when the throttle valve is kept in a full-closed state, the operation of an intake stroke of a piston of an engine causes the high negative pressure to occur in the downstream of the throttle valve. If this negative pressure acts on the throttle valve that is kept in the full-closed state, it is also thought that the throttle valve made of resin will be deformed.

One of the objects of the present invention is to provide a butterfly valve device made of resin, which is little susceptible the secular change in the fluid flow (in particular, the minimum flow) or to random changes, by solving at least one of the above-described problems.

The present invention has been made to achieve the above-described objects. According to the present invention, when a butterfly valve is located at a full-closed position facing a peripheral lower surface of a semicircular portion with respect to a rotating shaft of the butterfly valve made of a resin material, a partial annular projection is adapted to radially inwardly extend towards an inner wall surface of a fluid path, the partial annular projection including a plane that contacts the peripheral lower surface of the valve to form a fluid seal. As a result, the fluid negative pressure occurring on the downstream of the valve produces such force that the valve is pushed to (attracted) a seal surface. Therefore, it is possible to sufficiently ensure sealing characteristics at the time of shutting the valve.

To be more specific, the partial annular projection is provided in an area ranging from a pair of bearings which support a rotating shaft of the valve to a specific area in a circumferential direction (for example, a counter-rotation side half round portion located on the downstream side of the valve). According to another embodiment, the lacking part of the projection is provided in a specific range including a position whose distance from the pair of bearings becomes equivalent in the circumference direction, whereas the annular projection is provided in the remaining area up to the bearings. In addition, according to another embodiment, the valve periphery is provided with a R portion so that while the valve is pressed down to a seat surface, and after the valve gets away from the seat surface to open, the leakage airflow from a minute gap between the valve peripheral surface including the lacking part and the fluid path inner wall surface little changes until the specific opening is exceeded. As a result, the airflow does not suddenly increase if the valve gets away from the seat surface to open. To be more specific, a large inflection point does not occur in airflow characteristics. Accordingly, the control becomes stable (preferably, the partial annular projection is provided in the whole counter-rotation side half round portion located on the downstream side of the butterfly valve).

In a range excluding the lacking part, the minimum airflow is determined by a minimum gap between the periphery of the valve and the fluid path inner circumferential wall surface, and a gap between the periphery of the lower surface of the valve and a seal surface.

Preferably, the periphery of the valve is formed as a curved surface having the specific curvature in a thickness direction.

In addition, as another specific configuration, the partial annular projection is formed in an area ranging from a pair of bearings which support a rotating shaft of the valve to a specific range in a circumferential direction; and the remaining area is alternately formed with a projection and a projection lacking portion.

Preferably, an area between the whole periphery of the valve and the fluid path inner wall surface is formed with a minute gap used to adjust the minimum airflow; and only a peripheral lower surface of a semicircular portion with respect to the rotating shaft of the valve made of a resin material is formed with the projection. As a result, when the lower surface of the valve gets away from a seal surface to open, a minute gap between the peripheral surface of the valve and the fluid path wall surface is kept substantially constant within a specific minute angle range (for example, about the thickness of the valve). Moreover, if the whole periphery of the valve is formed with an R portion (a curved surface having the specific curvature) in a thickness direction, it is easier to keep a minute gap constant. In addition to it, it is possible to widen a range of the constant minute gap.

Preferably, if the periphery of the valve is formed as the curved surface having the specific curvature in a thickness direction of the valve over the entire perimeter, it becomes easier to keep the minute gap constant.

More preferably, while the valve opens only by the thickness thereof from a mechanically full-closed position, from which the valve cannot mechanically rotate any more in a close direction, a shape of the curved surface on the periphery of the valve is set so that the specified minimum airflow is achieved at the mechanically full-closed position.

In addition, in order to achieve the above-described object, according to another aspect of the present invention, cylindrical elastic sealing members are mounted around the shaft in a bearing hole, and the edge on the fluid path side of the sealing members elastically contacts the annular surface formed at a position facing the bearing hole about the rotating shaft of the valve.

Preferably, when a butterfly valve is located at a full-closed position facing a peripheral lower surface of a semicircular portion with respect to a rotating shaft of the butterfly valve made of a resin material, a partial annular projection radially inwardly extends towards an inner wall surface of a fluid path, the partial annular projection including a plane that contacts the peripheral lower surface of the valve to form a fluid seal. In addition, cylindrical elastic sealing members are mounted around the shaft in a bearing hole, and the edge on the fluid path side of the sealing members elastically contacts the annular surface formed at a position facing the bearing hole about the rotating shaft of the valve.

More preferably, the valve is formed in a rectangular or ellipsoidal shape having four corners, each of which has a R portion having the specific curvature; and a sealing member of the valve peripheral lower surface in a half round portion of the rotating shaft is formed with at least two areas: an area up to bearings on one side including at least the R portion on the one side; and an area up to the bearings on the other side including the R portion on the other side.

According to the present invention, it is possible to provide a butterfly valve device made of a resin material, which is capable of adjusting the fluid minimum flow even if a valve is formed of resin, and in which the minimum flow is not easily susceptible secular change even under the severe use situation.

DETAILED DESCRIPTION OF THE PREFERRED EMBODIMENTS

Figure 1:
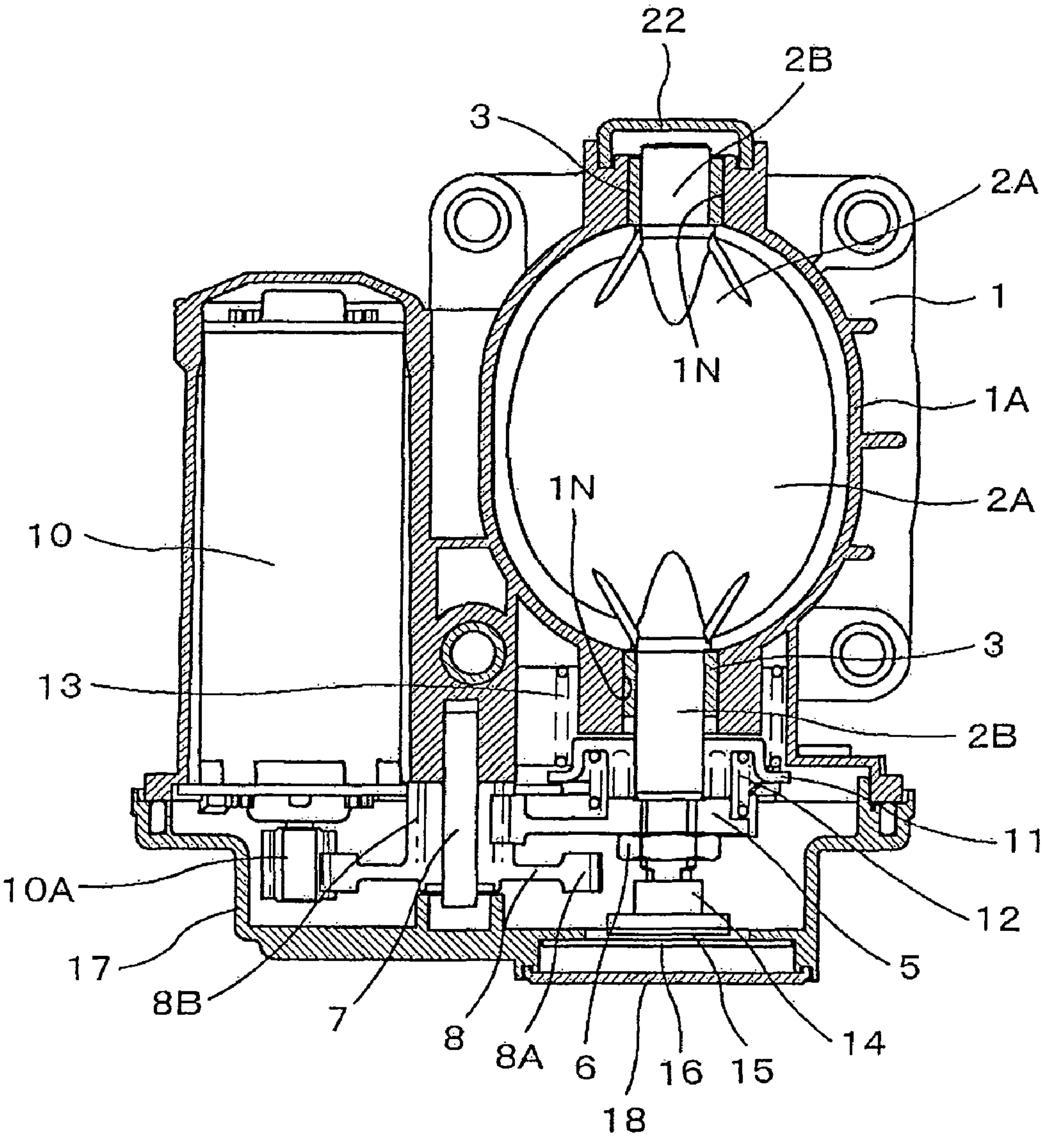
FIG. 1 is a cross sectional view illustrating essential parts according to an embodiment of the present invention.

The present invention will be described referring to, as an example, a throttle valve device of an internal combustion engine to which the present invention is applied in detail as below.

Background art of this embodiment will be described as below.

In recent years, because of the environmental problems, it is necessary to achieve the weight saving by improving the fuel efficiency, and to lower the idling revolution speed of an internal combustion engine. As disclosed in JP-A-10-89096, each of a throttle body, a throttle shaft, and a throttle valve, which are included in the conventional electronically controlled throttle device, is made of a metal material whose specific gravity is high. For this reason, as disclosed in Published Japanese translation of PCT application No. 2004-512451, it is thought that a throttle body, a throttle shaft, and a throttle valve are configured to be made of resin to achieve the weight saving. However, the throttle body's internal airflow path and the throttle valve, which are made of metal, are manufactured with high accuracy by machining to reduce the airflow leakage at low opening to a low level so that the reduction in idling revolution speed is achieved. On the other hand, in general, if the throttle body and the throttle valve are made of resin, the machining is not performed. Accordingly, a shape of the internal airflow path of the throttle body, and that of the throttle valve, depend on the molding accuracy, and the molding accuracy is not high. In addition to it, if the dimensional change caused by the environmental situation such as heat flow is taken into consideration, the size of the gap between the throttle body's internal airflow path and the throttle valve must be large enough to prevent the interference from occurring therebetween. Moreover, even if the internal airflow path of the throttle body made of resin is subjected to machining, it is not possible to shape the internal airflow path with high accuracy because of the deformation caused by a load placed on the throttle body at the time of machining, and because of the deformation caused by heat at the time of machining. Therefore, as is the case with the above-described example, the size of the gap between the throttle body's internal airflow path and the throttle valve must be large enough to prevent the interference from occurring therebetween. Thus, the leakage airflow at low opening including a full-closed position of the throttle valve increases, and consequently the idling revolution speed of the internal combustion engine becomes high, resulting in the low fuel efficiency although the weight saving can be achieved. This is a problem to be solved.

For the purpose of solving the above-described problem, JP-A-59-192843 discloses the method in which a throttle valve is provided with a groove on an outer circumference thereof, or an internal airflow path is provided with a step that is in contact with a throttle valve surface, so that an eddy current is generated to reduce the leakage. However, if a use state of the throttle of the internal combustion engine is taken into consideration (a sonic state at low opening), it is thought that this method cannot produce the effect of reducing the leakage airflow as much as expected. In addition, if the step of the internal airflow path is in contact with the throttle valve surface, it is possible to reduce the leakage airflow to a low level when the throttle valve is fully closed. However, when the throttle valve opens, the air flowing on the combustion chamber side fluctuates due to the influence of the step. As a result, there is a possibility that the airflow to be supplied to a cylinder will fluctuate.

Moreover, when the internal combustion engine is kept in an idling rotation state, the opening of the throttle valve is a point at which the throttle valve slightly opens from a full-closed position. This point is not mechanically maintained, but is maintained by the control. Heretofore, as disclosed in JP-A-2004-251238, when the throttle valve rotates from a full-closed position in an open direction, a gap between the throttle valve and the internal airflow path located the outside the throttle valve always becomes large, which causes the leakage airflow to increase. As a result, the leakage airflow at an idling position certainly becomes larger than the leakage airflow at the full-closed position of the throttle valve. In addition to it, on the assumptions that the vertical axis corresponds to the leakage airflow, and that the horizontal axis corresponds to the opening of the throttle valve, rising of airflow characteristics (the airflow inclination) becomes higher before and after the idling position, which causes fluctuations in the leakage airflow with respect to the opening of the throttle valve to increase. This means that the throttle valve opening range within which it is possible to ensure the leakage airflow for achieving the required idling revolution speed is narrow. This produces a problem that it is difficult to control the idling position.

According to this embodiment, if a throttle body, a throttle shaft, and a throttle valve, which are included in an electronically controlled throttle device, are made of a resin material, it is possible to reduce the leakage airflow when the opening of the throttle valve corresponds to a full-closed position, or when the opening of the throttle valve corresponds to a low opening position including a control-based full-closed position at which the throttle valve is slightly opened from the full-closed position. Moreover, it is possible to achieve characteristics that reduce the increase in airflow leaking out from the throttle body's internal airflow path, and the throttle valve, with respect to the opening of the throttle valve. Therefore, it is possible to improve the controllability of the opening of the throttle valve at the idling opening position.

If the throttle valve is made of resin, the negative pressure applied from the downstream of the throttle valve (or, in the case of an internal combustion engine having a supercharging function, in a state in which the pressure is applied) causes the throttle valve to bend. As a result, a gap between the throttle body's internal airflow path and the throttle valve is widened, which causes the leakage airflow occurring when the throttle valve is located at the low opening position to increase. As disclosed in Published Japanese translation of PCT application 2004-512451, by configuring the throttle valve to have a shape of an ellipse whose longitudinal direction corresponds to a rotating shaft direction of the throttle valve, it is possible to ease the bending of the tip of the throttle valve, and thereby to suppress the increase in leakage airflow. However, only this method cannot prevent the leakage airflow from increasing when the throttle valve is located at a low opening position, including at a full-closed position. It is because if the throttle body and the throttle valve are made of resin, a gap between the throttle body's internal airflow path and the throttle valve must be large from the viewpoint of the prevention of interference (prevention of beveling) because the accuracy of molding is low as described above. If anything, if the aperture area obtained when the throttle valve is located at a full-opened position is ensured, the circumference of an elliptical internal airflow path/an elliptical valve becomes longer than that of a circular internal airflow path/a circular valve. If a gap between the throttle body's internal airflow path and the throttle valve side surface of the elliptical internal airflow path/the elliptical valve is the same as that of the circular internal airflow path/the circular valve, the leakage airflow of the elliptical internal airflow path/the elliptical valve occurring when the throttle valve is located at the low opening position becomes larger because the circumference is longer.

A problem to be solved is as follows. If a throttle body, a throttle shaft, and a throttle valve are made of resin to achieve the weight saving, the accuracy of the throttle body's internal airflow path, and that of the outer circumference of the throttle valve, are low. Therefore, if a gap between the throttle body's internal airflow path and the throttle valve is made wider than a gap between the conventional throttle body and throttle valve, which are made of metal, the airflow leaking from the gap between the throttle body's internal airflow path and the throttle valve increases when the throttle valve is located in a low opening area including a mechanically full-closed position, and a control-based full-closed position, or including a position of the opening corresponding to the idling rotation.

Objects of this embodiment are to achieve the weight saving by making main components of a throttle device (a throttle body, a throttle shaft, and a throttle valve) of resin, and to decrease the leakage airflow leaking from a gap between a throttle body's internal airflow path and the throttle valve when the throttle valve is located in a low opening area including a mechanically full-closed position, and a control-based full-closed position, or including a position of the opening corresponding to the idling rotation, and thereby to reduce the idling revolution speed of an internal combustion engine to a low level so that the fuel efficiency is improved.

A second problem to be solved is as follows. As one method for solving the problem, if an internal airflow path is provided with a step that contacts a throttle valve, the leakage airflow can be reduced not only by an eddy current in the step, but also in a sonic state. Moreover, it is possible to reduce fluctuations in air flowing into a combustion chamber.

Another problem to be solved is as follows. By eliminating or suppressing the increase in leakage airflow with respect to the opening of the throttle valve, it is possible to widen an opening area of a throttle valve with respect to the leakage airflow for achieving the required idling revolution speed so that the controllability is improved.

On the basis of the above description, characteristics of the throttle device used for the internal combustion engine according to this embodiment will be summarized as below.

The problem to be solved is that if a throttle body, a throttle shaft, and a throttle valve are made of resin, the accuracy in shape of the throttle body's internal airflow path, and that of the throttle valve side surface, are low. Therefore, even if the distance (clearance) between the throttle internal airflow path and the throttle valve is widened so that the interference do not occur, the leakage airflow at the time of low opening, including when the throttle valve is located at a full-closed position, is decreased to reduce the idling revolution speed of an internal combustion engine to a low level so that the fuel efficiency is improved. Then, at low opening, by eliminating or suppressing the increase in airflow with respect to the opening of the throttle valve, the idling controllability is improved.

On the downstream side of the throttle device, only an area in proximity to a shaft hole of a throttle shaft is formed with a projection having a shape that extends along an internal airflow path of a throttle body. By narrowing a gap between an internal airflow path and a throttle valve side surface at low opening, the leakage airflow is reduced. An elastic body is mounted at least on the internal airflow path side of slide bearings for supporting the throttle shaft made of resin, so that a gap of the throttle shaft is sealed. As a result, the leakage airflow from the throttle shaft is eliminated, and thereby the leakage airflow is reduced in the throttle device as a whole. Moreover, the throttle valve side surface is configured to have a spherical or cylindrical shape with the axis of the throttle shaft applied as the center of the shape. With respect to a surface that is perpendicular to an internal airflow path passing through the axis of the throttle shaft, a range of the throttle valve side surface is on the close side of the throttle valve including the perpendicular surface in question. As a result, it is possible to widen a range within which the aperture area is kept constant when the throttle valve is slightly opened from a full-closed position. This makes it possible to prevent the leakage airflow occurring when the throttle valve is located at a low opening position from increasing, and to prevent the leakage airflow with respect to the throttle valve opening at the time of idling, or the like, from increasing, so that the idling controllability can be improved.

The throttle device used for the internal combustion engine is configured to include the throttle body, the throttle shaft, and the throttle valve, which are made of resin, so that the weight saving is achieved. In addition to it, because the accuracy in shape of the throttle body's internal airflow path, and that of the throttle valve side surface, are low, even if the distance between the throttle body's internal airflow path and the throttle valve side surface is made larger so as to prevent the interference from occurring, it is possible to prevent the leakage airflow from increasing in a full-closed airflow area, and in a low opening area. Moreover, by eliminating or reducing the increase in leakage airflow with respect to the rotation angle of the valve at low opening, it is possible to improve the idling control.

First Embodiment

FIG. 1 is a cross sectional view illustrating essential parts according to an embodiment of the present invention. A motor-driven electronically controlled throttle device includes: a throttle body's internal airflow path 1A that forms part of an intake path of an internal combustion engine; and a throttle valve 2A that is rotationally mounted inside the internal airflow path 1A. The throttle valve 2A and a throttle shaft 2B are molded of resin as one unit. The throttle shaft 2B is supported by slide bearings 3, which are made of resin, at both ends of the throttle body's internal airflow path 1A so that the throttle shaft 2B can rotate. A throttle valve shaft 2 cannot be assembled after it is molded of resin together with a throttle body. Therefore, one of the following methods is adopted: molding the throttle valve shaft 2, and then mounting the throttle valve shaft 2 to a shaping die of a throttle body 1 before molding the throttle body 1; molding the throttle body 1, and then molding the throttle valve shaft 2 inside the throttle body 1; and simultaneously molding both the throttle body 1 and the throttle valve shaft 2 by use of one shaping die.

Figure 2:
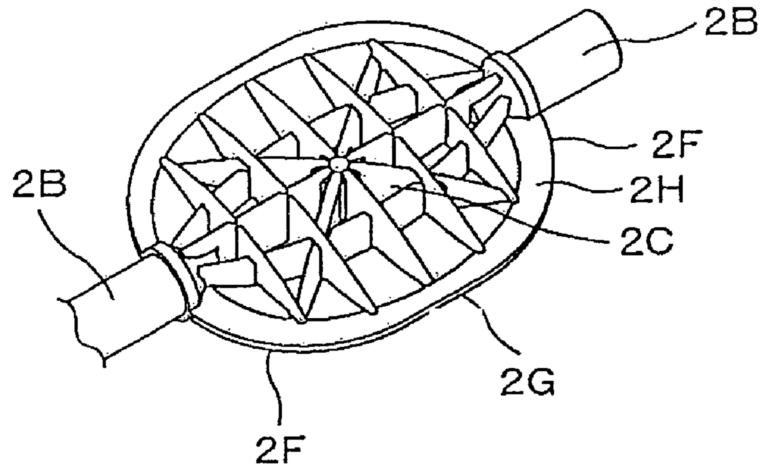
FIG. 2 is a diagram illustrating a shape of a throttle valve rib according to the embodiment of the present invention.
Figure 3:
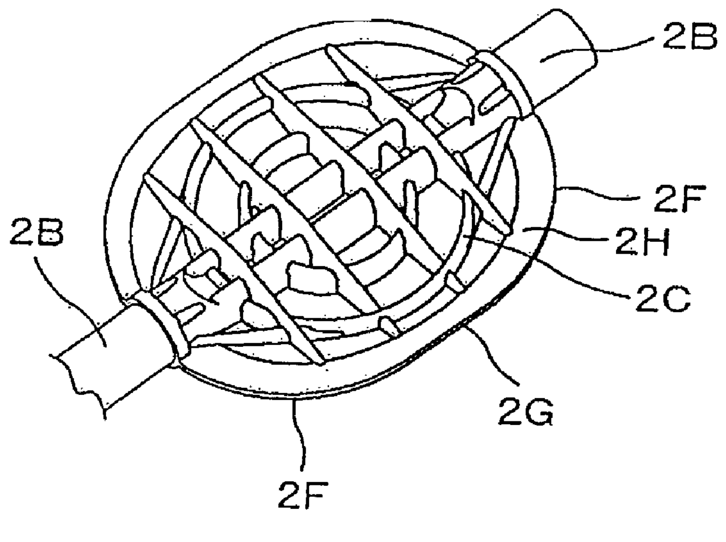
FIG. 3 is a diagram illustrating a shape of a throttle valve rib according to the embodiment of the present invention.
Figure 4:
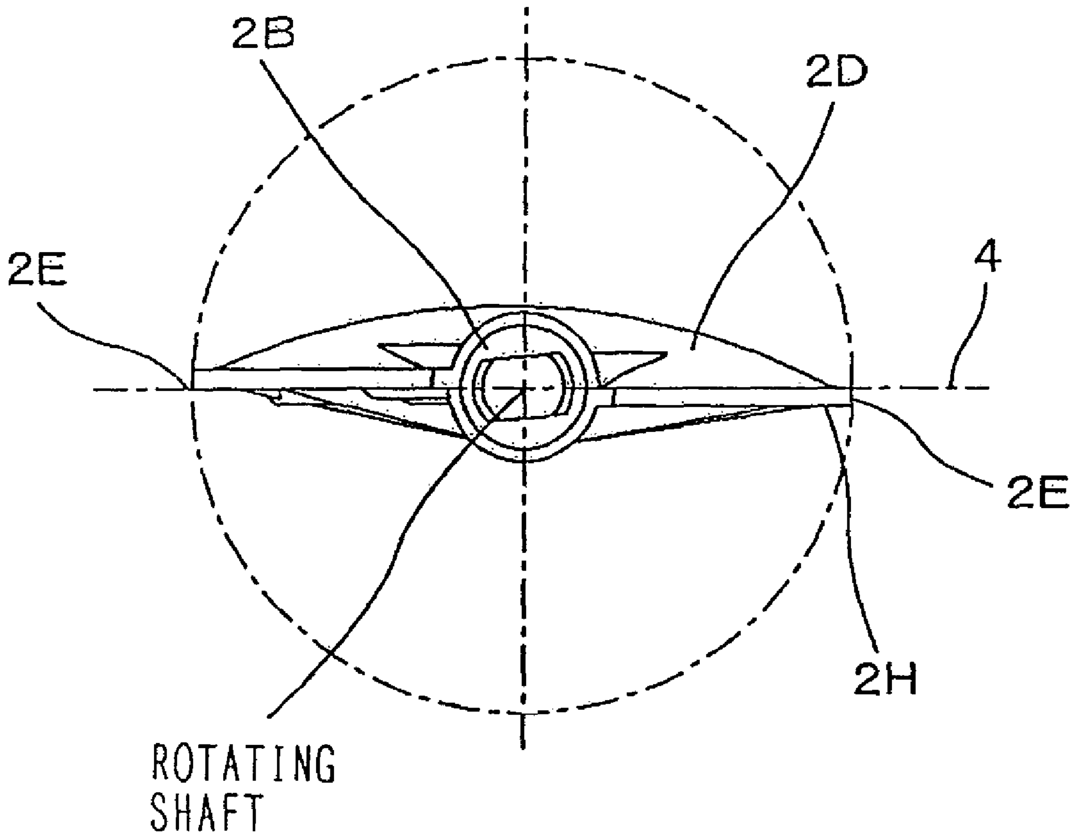
FIG. 4 is a side view illustrating a shape of a throttle valve according to the embodiment of the present invention.

As shown in FIG. 1, each of the throttle body's internal airflow path 1A and the throttle valve 2A has a shape of an ellipse that is formed by a circular arc and a straight line. The length in the axial direction of the throttle shaft 2B is longer than the length in a direction that is orthogonal to an axis of the throttle shaft 2B. In addition, the shape of the throttle valve 2A is not limited to the ellipse. If the features of resin molding are taken advantage of, as shown in FIGS. 2, 3, a shape extending from the axial center of the shaft in a direction of the tip of the valve is used; and in order to ease the bending of the throttle valve 2A, the throttle valve 2A is provided with a rib 2C that has for example a circular shape, and that is used to increase the stiffness of a valve surface. Although many ribs exist in FIGS. 2, 3, some of them are omitted, and not all of the ribs are given reference numerals. It is assumed that a throttle valve surface 2D has an arched shape such as an eggshell as shown in FIG. 4. Because the throttle valve shaft 2 slides on the bearings, a material of the throttle valve shaft 2 is a resin material that has the high wear resistance, that does not damage a bearing material, and that has the high strength even under high temperature conditions. For example, there is super engineering plastic to which carbon, polytetrafluoroethylene resin (known as "Teflon" that is a registered trademark of Du Pont), glass, and the like, are added.

Figure 6:
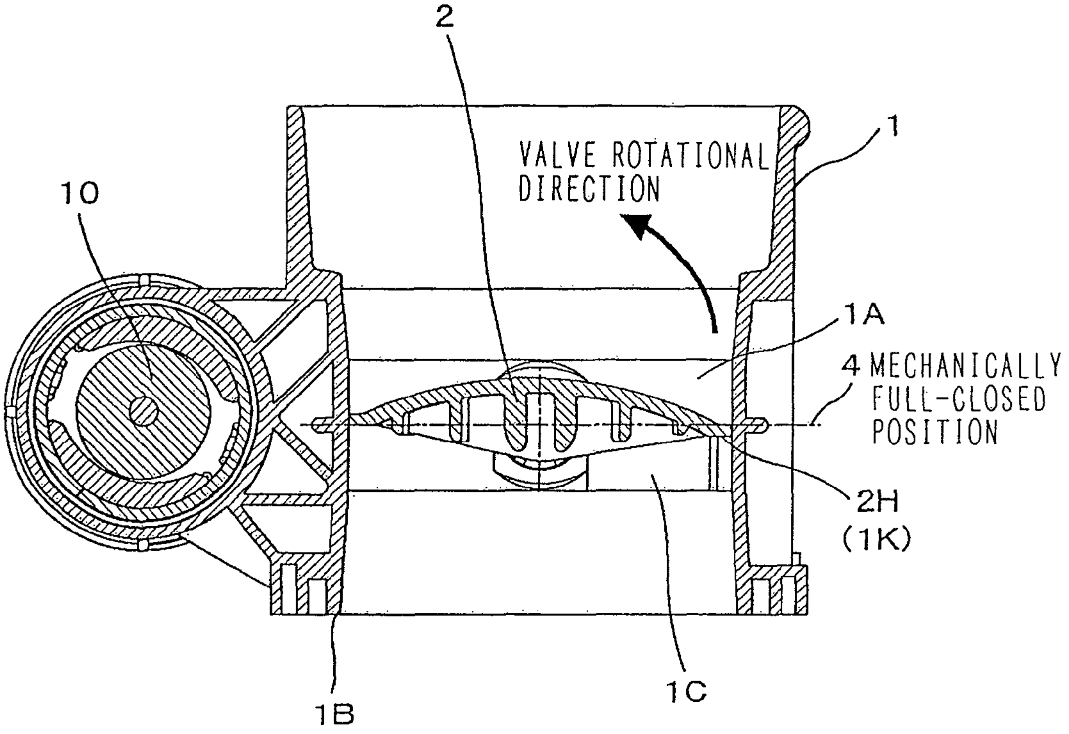
FIG. 6 is a diagram illustrating a shape of a throttle body's internal airflow path according to the embodiment of the present invention.

As shown in FIG. 6, the throttle body's internal airflow path 1A is provided with a projection 1C on the inside thereof only in a direction in which when the throttle valve 2A rotates in an open direction with the rotation axis of the throttle shaft 2B applied as the center, the projection 1C gets away. Here, the projection 1C has a shape extending along a gap between the throttle valve 2A and the throttle body's internal airflow path 1A on the downstream side of the throttle valve 2A (on the side near from a combustion chamber); and the projection 1C is thicker than a gap between the throttle body's internal airflow path 1A and a throttle valve side surface 2E. In other words, the throttle body's internal airflow path 1A is provided with the projection 1C on the inside thereof only in a direction in which when the minute opening intake negative pressure is applied to the throttle valve 2A, the projection 1C does not hinder the throttle valve 2A from rotating, and at the same time the throttle valve 2A bends. In this case, the projection 1C is configured to have a surface that is parallel to a reference plane 4 which passes through the rotation center of the throttle shaft 2B, and which is orthogonal to the throttle body's internal airflow path 1A.

Figure 7:
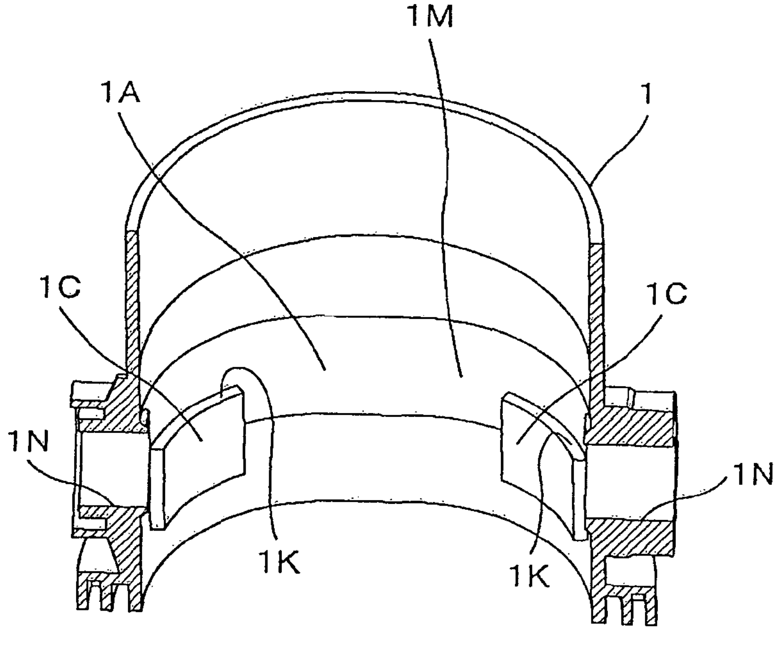
FIG. 7 is a diagram illustrating a shape of a throttle body's internal airflow path according to the embodiment of the present invention.
Figure 8:
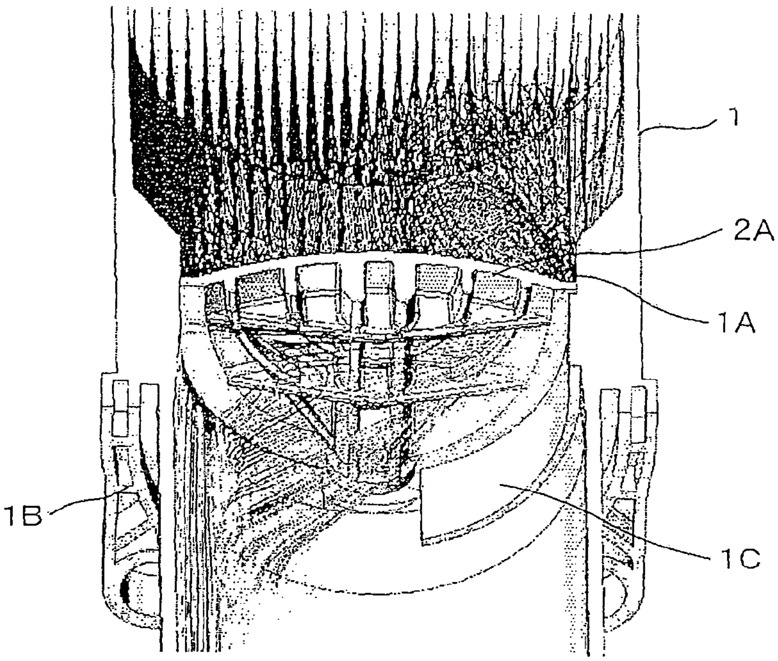
FIG. 8 is a diagram illustrating the airflow according to the embodiment of the present invention.
Figure 9:
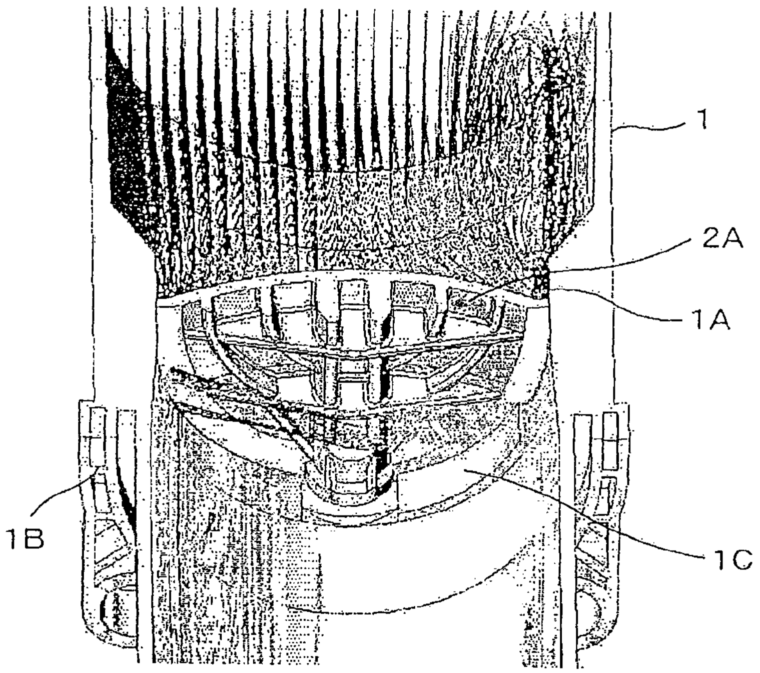
FIG. 9 is a diagram illustrating the airflow according to the embodiment of the present invention.

In addition, this projection 1C is configured to contact the throttle valve surface 2D at a full-closed position. However, when the throttle valve 2A is gradually opened, a gap between the projection 1C and a throttle valve plane 2H gradually becomes wider than the gap between the throttle body's internal airflow path 1A and the throttle valve side surface 2E from the tip of the throttle valve 2A. In the gap between the projection 1C and the throttle valve plane 2H, an area in which the sensitivity to the rotation of the throttle valve 2A is the lowest is an area in proximity to a throttle shaft. To be more specific, an area in which the effects of the projection 1C produced by the rotation of the throttle valve 2A continue for the longest period of time is an area in proximity to the throttle shaft. Accordingly, as shown in FIG. 7, the projection 1C is provided in only this area. On the assumption that the throttle body's internal airflow path 1A is provided with the projection 1C over a halfway around, as shown in FIG. 8, when the throttle valve 2A is located in a low opening area, the airflow on the downstream side fluctuates (according to the fluid analysis). This leads to fluctuations in airflow flowing into each cylinder depending on a shape of a conduit line in the downstream. As described above, as shown in FIG. 7, if the throttle body's internal airflow path 1A is provided with the projection 1C, the fluctuations in leakage airflow are reduced although the leakage airflow increases at the full-closed position and at minute opening as shown in FIG. 9.

Figure 10:
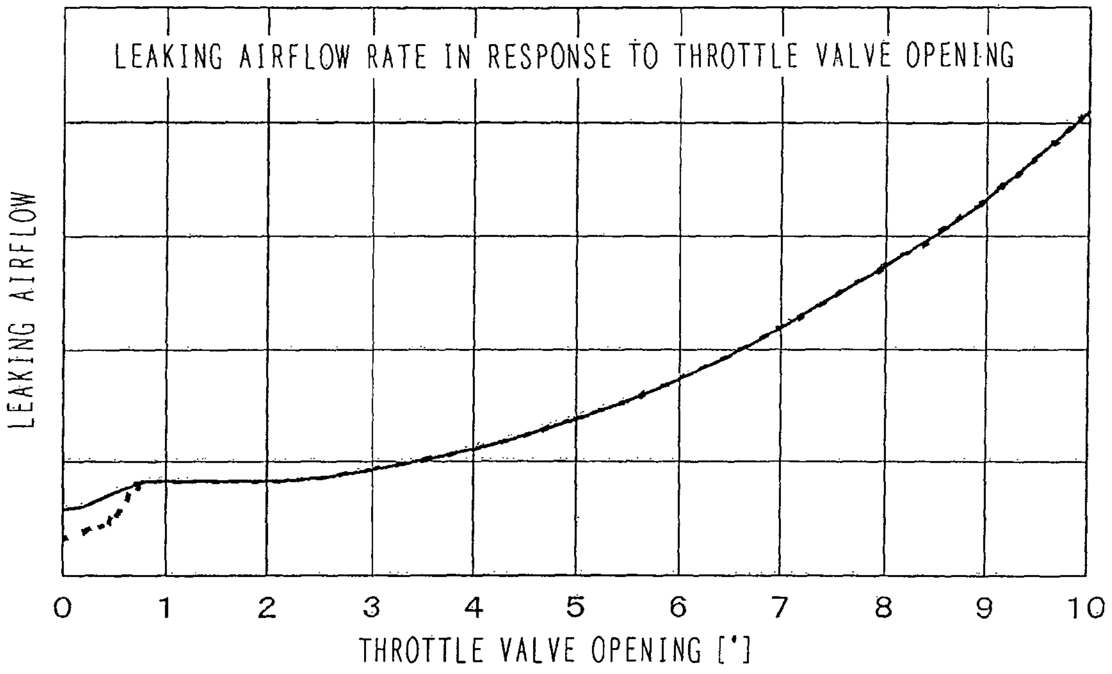
FIG. 10 is a graph illustrating airflow characteristics according to the embodiment of the present invention.

Moreover, on the assumption that the throttle body's internal airflow path 1A is provided with the projection 1C over a halfway around, as indicated with a broken line in FIG. 10, when the throttle valve 2A is located in a low opening area, the change in leakage airflow is extremely large. When the throttle valve 2A is located at a full-closed position, the projection 1C contacts a throttle valve surface 1H, which causes the leakage airflow to extremely decrease. Accordingly, when the throttle valve 2A is located at the full-closed position, the leakage airflow at this point of time largely differ from that at a point at which a gap between the throttle valve side surface 2E and the throttle body's internal airflow path 1A becomes smaller than a gap between the throttle valve surface 1H and the projection 1C. Therefore, the change in airflow is large in the opening area. As shown in FIG. 7, the reason why the sensitivity to the rotation of the throttle valve 2A is low is that if the projection 1C is provided in only an area in proximity to the throttle shaft, the leakage airflow moderately decreases when the throttle valve 2A is located at a full-closed position, and consequently the smooth airflow characteristics are achieved as indicated with a solid line in FIG. 10. A range within which the throttle body's internal airflow path 1A is provided with the projection 1C is changed in response to airflow characteristics at desired low opening. To be more specific, if a higher priority is given to the change in airflow at low opening than to the low leakage airflow at a full-closed position, the providing range of the projection 1C is narrowed. On the other hand, if a higher priority is given to the low leakage airflow at a full-closed position than to the change in airflow at low opening, the providing range of the projection 1C is widened.

Next, characteristics other than the airflow characteristics will be described. If many stains including deposit exist inside the throttle body's internal airflow path 1A, when the throttle valve 2A is located at a full-closed position, the projection 1C contacts the throttle valve plane 2H. Therefore, stains are put therebetween. If the turning force is applied to the throttle valve 2A with this state kept, the pressure is applied to a contacting surface. Therefore, there is a possibility that the stains will cause sticking. If the projection 1C is provided in only an area in proximity to the shaft, an area in which stains cause sticking becomes smaller. In addition to it, because the throttle valve 2A is near from the rotating shaft, the torque required to eliminate the sticking is small. Therefore, it is possible to easily eliminate the sticking by the motor torque.

Figure 11:
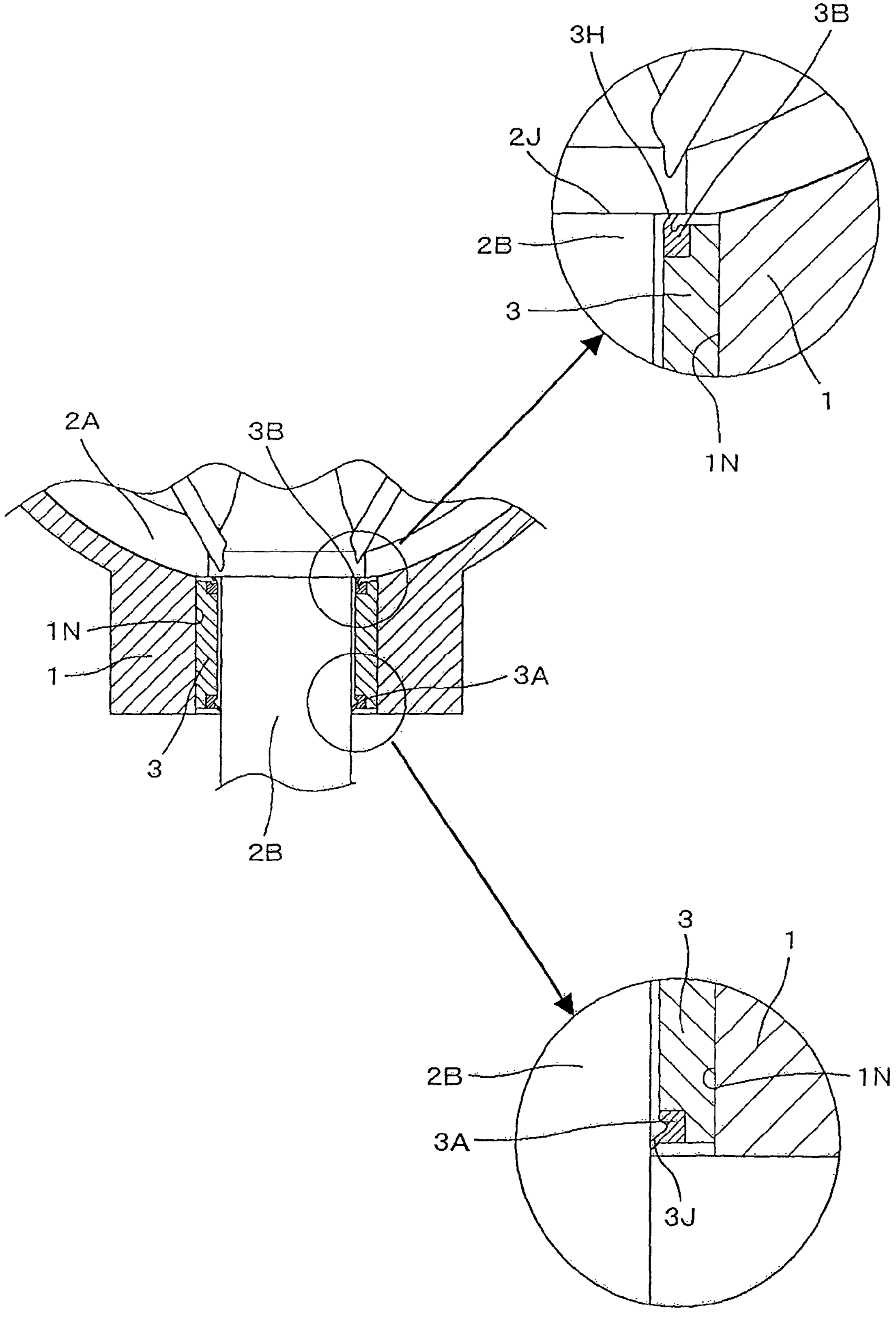
FIG. 11 is a diagram illustrating slide bearings according to the embodiment of the present invention.

As shown in FIG. 1, the slide bearings 3 are secured to the throttle body 1 at both ends of the throttle body's internal airflow path 1A by insert molding, press fitting, or the like, so that the throttle shaft 2B is rotatably supported. FIG. 11 is a diagram illustrating in detail the slide bearings 3. The slide bearings 3 are made of resin. The slide bearings 3 are provided with a sealing member 3A, which is an elastic body, by integral molding or welding on the side that is far from the throttle body's internal airflow path 1A. In addition, the slide bearings 3 are provided with a sealing member 3B, which is an elastic body, by integral molding or welding on the side that is near from the throttle body's internal airflow path 1A. The sealing member 3A is set in such a manner that some amount of tension is maintained between the sealing member 3A and an outer circumferential surface of the throttle shaft 2B. On the other hand, the sealing member 3B is set in such a manner that some amount of tension is maintained between the sealing member 3B and a throttle shaft bearings surface 2J. As a result, it is possible to prevent air from leaking from an area around the slide bearings 3 of the throttle shaft 2B. In this case, if the positive or negative pressure of the throttle body's internal airflow path 1A is not large, the sealing member 3A provided on the side that is far from the throttle body's internal airflow path 1A may also be omitted. In addition, because the sealing member 3B may also be set in such a manner that some amount of tension is maintained between the sealing member 3B and the throttle shaft bearings surface 2J, a set position with respect to the throttle body 1 of the slide bearings 3 is allowed to deviate to some extent. Accordingly, even if molding or work varies to some extent, it is possible to achieve the high sealing properties.

Figure 5:
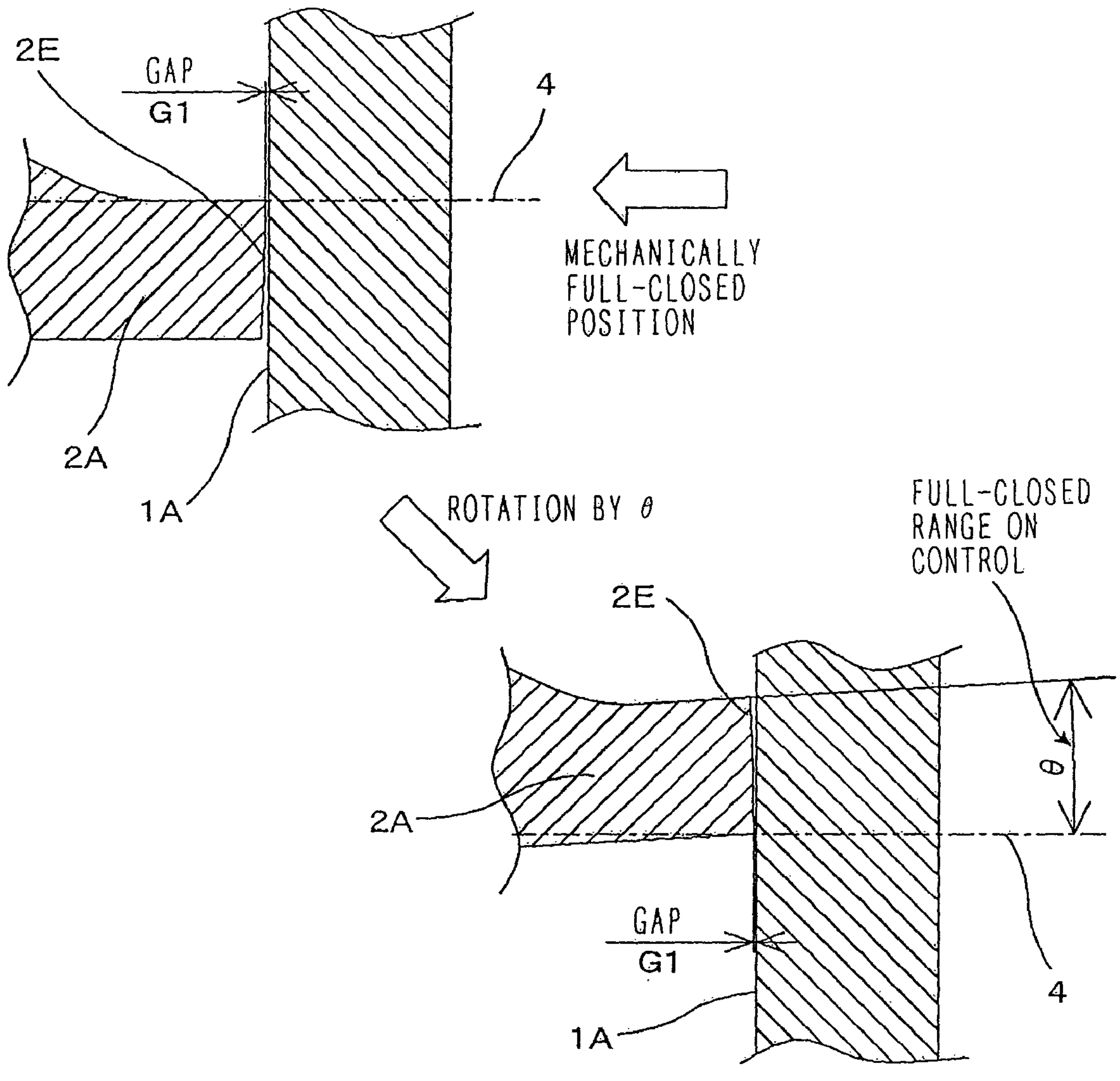
FIG. 5 is a diagram illustrating a throttle valve at low opening according to the embodiment of the present invention.

For a side surface 2E of the throttle valve (2A), as shown in FIG. 4, with the rotation axis of the throttle shaft 2B applied as the center, a throttle valve arc-shaped portion 2F and a throttle valve linear portion 2G, which are shown in FIGS. 2, 3, are formed into a spherically shape and a cylindrical shape respectively. When the side surface 2E of the throttle valve (2A), which is formed into this shape, is located at a full-closed position that is vertical to the throttle body's internal airflow path 1A, the side surface 2E is located on the opposite side of a direction in which the throttle shaft 2B rotates, with respect to the reference plane 4 that passes through the rotation axis of the throttle shaft 2B, and that is vertical to the throttle body's internal airflow path 1A. As a result, as shown in FIG. 5, while the throttle valve 2A rotates up to an angle θ at which a point which is the farthest from the reference plane of the throttle valve 2A reaches the reference plane 4, a gap between the throttle body's internal airflow path 1A and the side surface 2E of the throttle valve 2A is kept constant over the entire perimeter. This prevents the leakage airflow from increasing.

As shown in FIG. 1, a throttle gear 5, which is used to transfer the torque to the throttle shaft 2B, is secured to the throttle shaft 2B by a nut 6 or welding. In addition, the throttle gear 5 engages a small gear 8B of an intermediate gear 8 that has a large gear 8A and the small gear 8B. The intermediate gear 8 rotates with an intermediate gear shaft 7 used as an axis, the intermediate gear shaft 7 being mounted to the throttle body 1 by press fitting, insert molding, or integral molding. The large gear 8A of the intermediate gear 8 engages a motor gear 10A of a motor 10 that is secured to the throttle body with a screw 9. The torque of the motor 10 is transferred to the throttle gear 5 through these gears.

Figure 12:
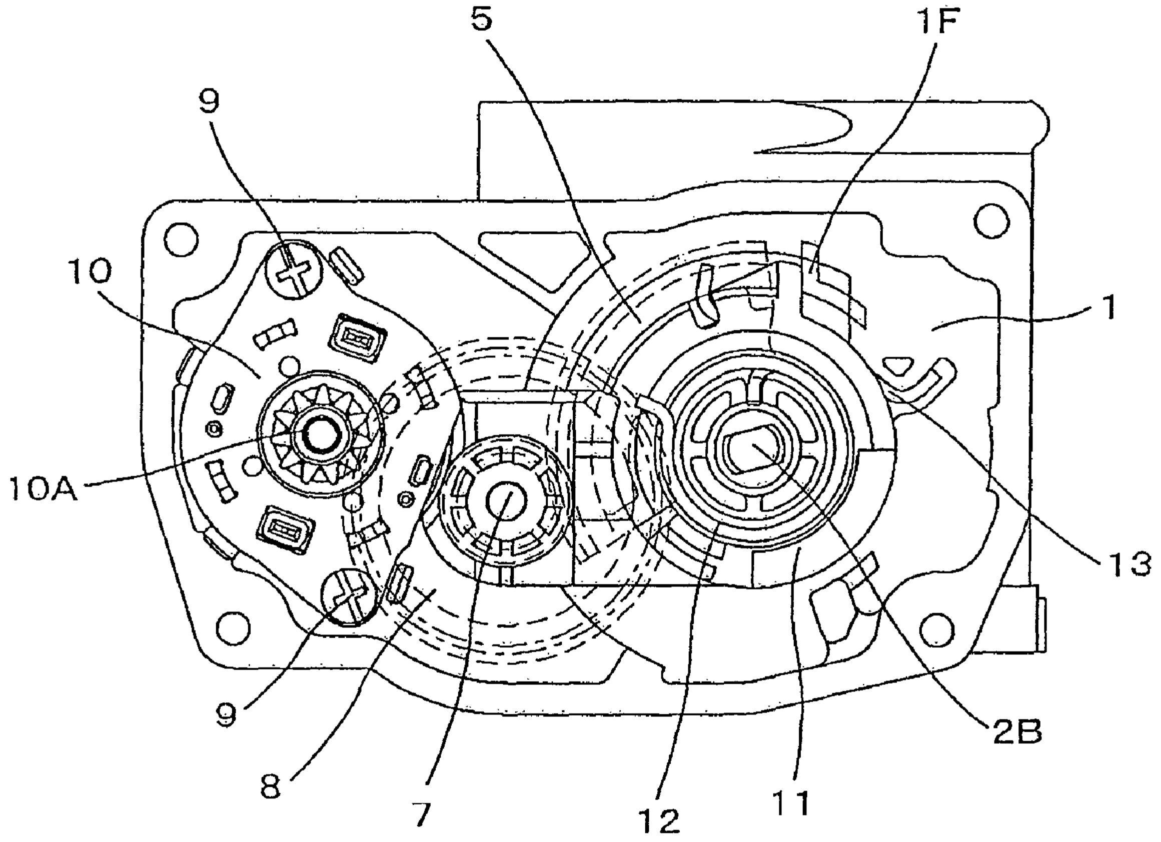
FIG. 12 is a diagram illustrating the inside of a gear cover according to the embodiment of the present invention.
Figure 13:
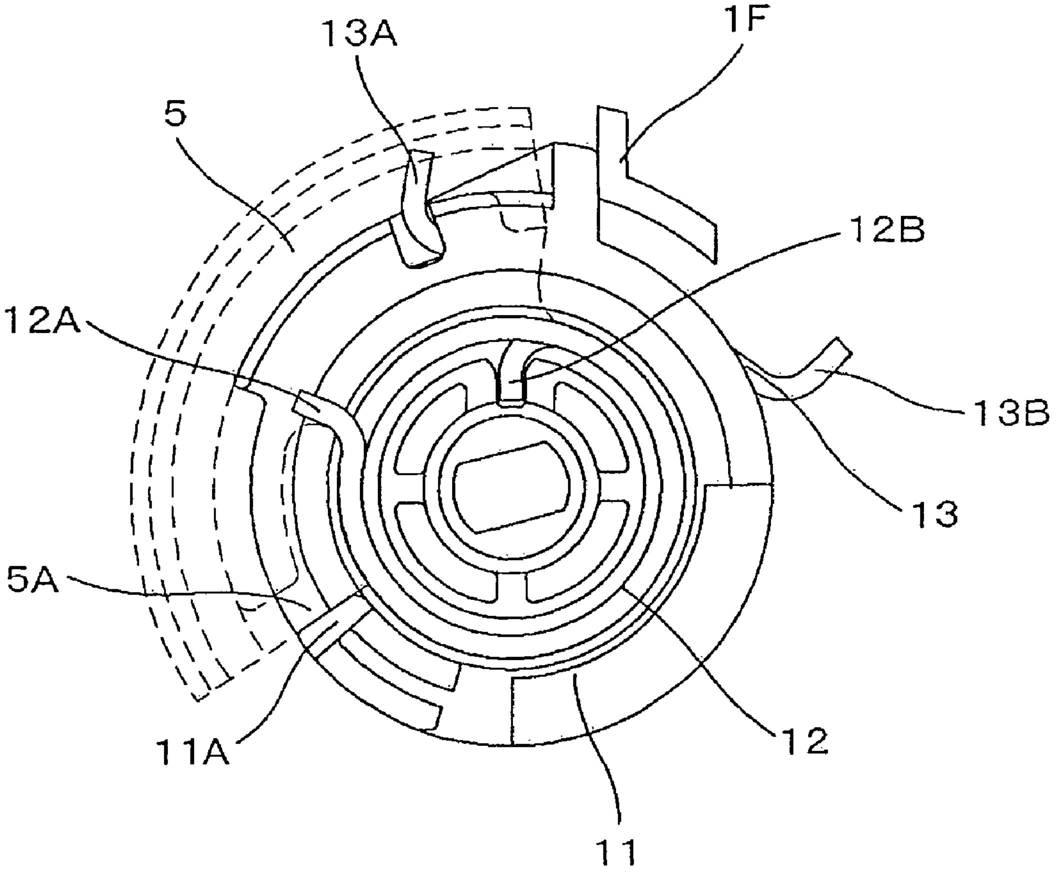
FIG. 13 is an enlarged view illustrating an area around a throttle gear according to the embodiment of the present invention.

The throttle gear 5 not only transfers the torque, but also has a default spring 12 that is located between the throttle gear 5 and a default lever 11. The default spring 12 is connected to the throttle gear 5 by a default spring hook X 12A; and the default spring 12 is connected to the default lever 11 by a default spring hook Y 12B. Accordingly, it is possible to apply the torque in directions opposite to each other by use of the default spring 12. As shown in FIGS. 12, 13 illustrating this part in detail, the default spring 12 contacts the throttle gear end face 5A at a default lever projection 11A. Accordingly, the torque is applied in directions opposite to each other. The default lever 11 is also connected to a throttle spring 13 with a throttle spring hook X 13A. The other throttle spring hook Y 13B is connected to the throttle body 1. The torque is always applied to the default lever 11 in a direction in which the throttle valve 2A rotates in a full-closed direction by the throttle spring 13. Here, default opening is a point at which the torque of the motor 10 is not applied so that the default lever 11 contacts a stopper 1F to balance only by the spring force. The throttle gear end face 5A described above is spaced away from the default lever projection 11A at the default opening or less. In this case, the default spring 12 generates the torque that is used to return the throttle gear 5 to the default opening. If the torque of the motor is released, the throttle valve 2A returns to the default opening together with the interlocked throttle gear 5 at every opening. To be more specific, at the opening that is larger than the default opening, the throttle valve 2A returns to the default opening by the throttle spring 13, whereas at the opening that is smaller than the default opening, the throttle valve 2A returns to the default opening by the default spring 12.

In addition, when the throttle valve 2A is located at a full-closed position, the throttle valve 2A contacts the projection 1C as described above. However, this part is not subject to all of the turning force. The load is mostly applied to a contact surface between the throttle gear 5 and the stopper 1F. In another case, another stopper may also be placed to support the load. This is because, in the throttle valve shaft 2 made of resin, the large twisting torque is generated by a contact point formed with the projection 1C, and by a joint surface formed with the throttle gear 5 used to transfer the torque from the motor 10, and accordingly there is a possibility that a throttle valve shaft will be damage by the large twisting torque. In order to control the contact load between the throttle valve 2A and the projection 1C so that the contact load is further decreased, the throttle body 1 may also be provided with a threaded screw hole, instead of using the stopper 1F, so that a contact position for contacting the throttle gear 5 is adjusted by an adjusting screw.

On the other hand, a rotor holder 14 made of resin is secured to the tip of the throttle shaft 2B by an adhesive, welding, heated tightening, or the like. A rotor substrate 15 for detecting the position opening of the throttle valve 2A is mounted to the rotor holder 14 by an adhesive, welding, heated tightening, or the like, so that the rotor substrate 15 rotates together with the throttle shaft 2B as one unit. An oscillator coil for transmitting signals to the rotor substrate 15, a receiver coil for receiving the signals, and a substrate 16 including an IC for handling the signals are located at positions that are slightly spaced away from the rotor substrate 15 in parallel. Because the throttle shaft 2B is made of resin, the throttle shaft 2B does not exert an influence upon output signals of the substrate 16. Accordingly, the oscillator coil, the receiver coil, and the substrate 16 are located in an area in proximity to the tip of the throttle shaft 2B. In addition, in order to reduce the thermal stress that is transferred from a gear cover 17 to the substrate 16, both of them are secured to each other by, for example, a silicon adhesive that is flexible. Further, in an area outside them, in order to protect the substrate 16 against foreign materials coming from the outside, gas and water which corrode a conductive material of the substrate 16, and the like, a cover 18 is secured to the gear cover 17 by an adhesive or welding.

Figure 14:
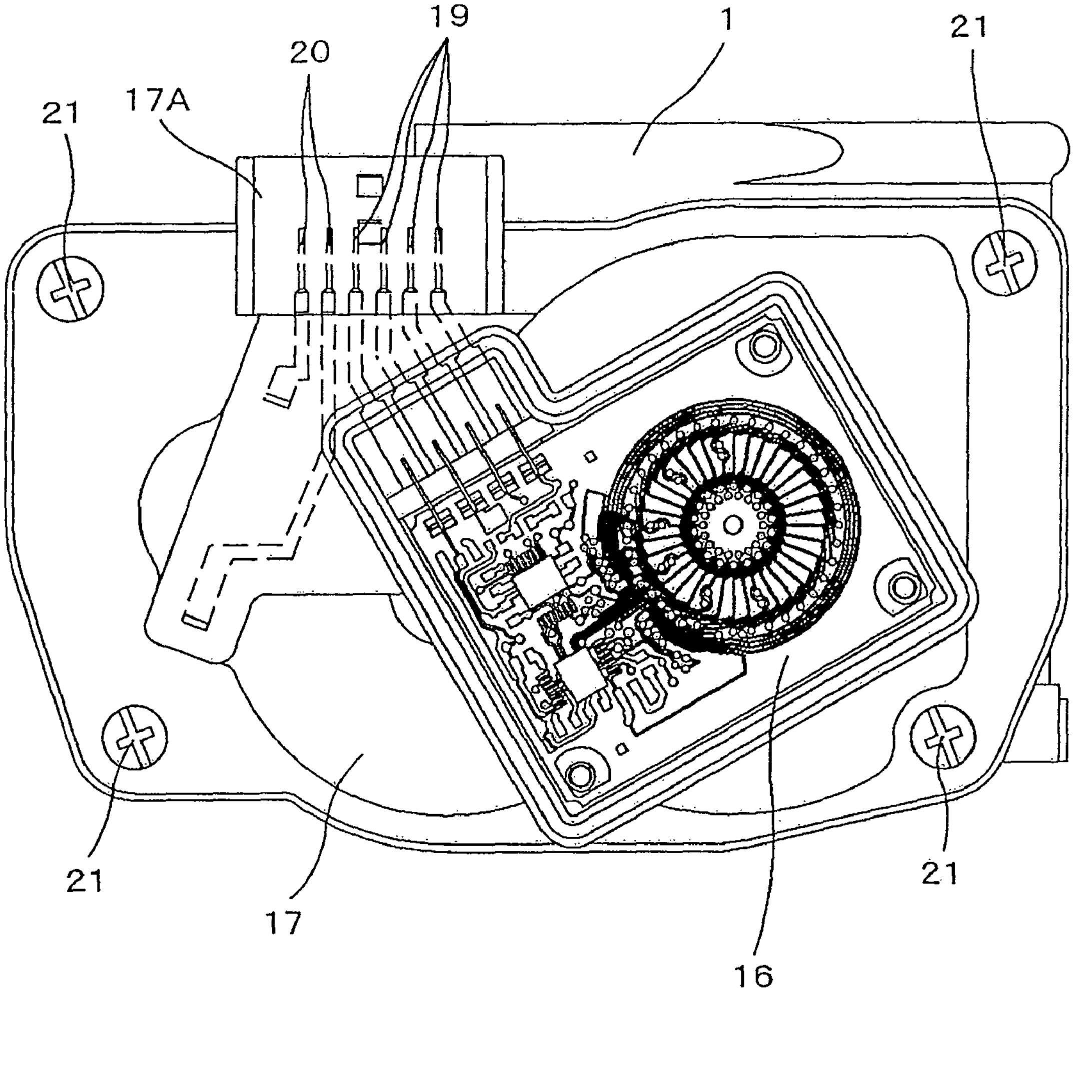
FIG. 14 is a diagram illustrating the gear cover according to the embodiment of the present invention.

FIG. 14 is a diagram illustrating a state before the cover 18 is mounted. As shown in FIG. 14, the electric power to be supplied to the substrate 16, and an output signal transmitted from the substrate 16, are inputted/output from/to the gear cover connector 17A through sensor terminals 19 that are insert-molded in the substrate 16 and the gear cover 17, and through sensor terminals 19 that are connected by wire bonding or welding. As is the case with the sensor terminals 19, the electric power of the motor 10 described above is also supplied from the gear cover connector 17A through motor terminals 20 that are insert-molded in the gear cover 17. The gear cover 17 is secured to the throttle body 1 with a gear cover retaining screw 21, or by heat welding over the entire perimeter.

On the other hand, for the shaft on the opposite side of the gear cover 17, a cap 22 is secured to the throttle body 1 by an adhesive, welding, or the like, so that the throttle body's internal airflow path 1A is isolated from the outside.

Second Embodiment

Figure 15:
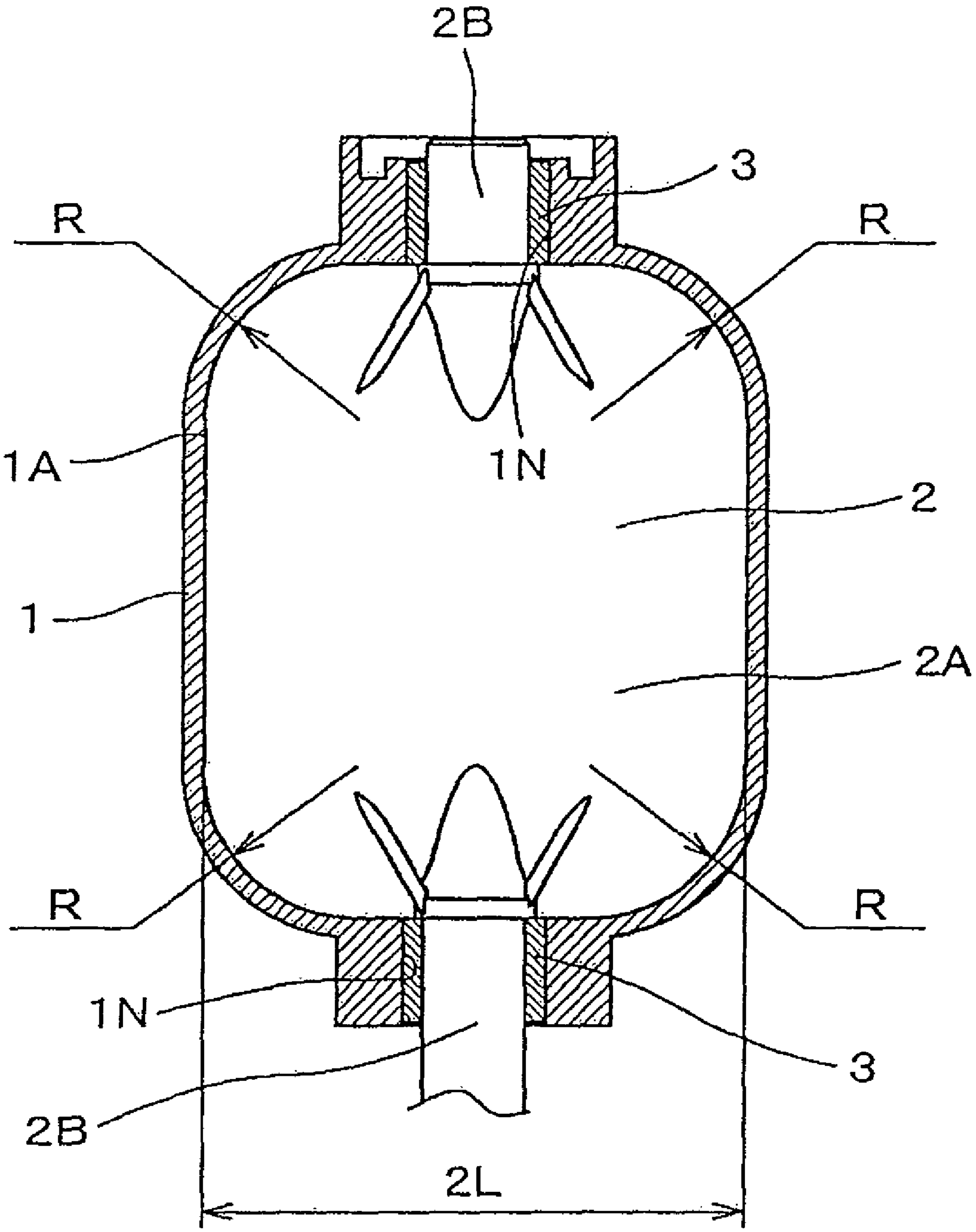
FIG. 15 is a diagram illustrating a shape of a throttle valve according to another embodiment of the present invention.

FIG. 15 is a diagram illustrating another embodiment of the present invention. The description in the first embodiment is based on the assumption that each of the throttle body's internal airflow path 1A and the throttle valve 2A has a shape of an ellipse. However, R shown in FIG. 15 may also be changed within a range from 0 to L. When R=0, each of the throttle body's internal airflow path 1A and the throttle valve 2A has a shape of a rectangle. On the other hand, when R=L, each of the throttle body's internal airflow path 1A and the throttle valve 2A has a shape of an ellipse as shown in FIG. 1. In addition, each of the throttle body's internal airflow path 1A and the throttle valve 2A may also have a shape of a circle or an oval.

In addition, for each of the throttle body's internal airflow path 1A and the throttle valve 2A, with the objective of further easing the bending of the throttle valve 2A, the throttle body's internal airflow path 1A is divided into two or more (what is called, a multiple throttle device) so as to decrease a diameter (the size) of the throttle body's internal airflow path 1A. This method may also be adopted.

Third Embodiment

Figure 16:
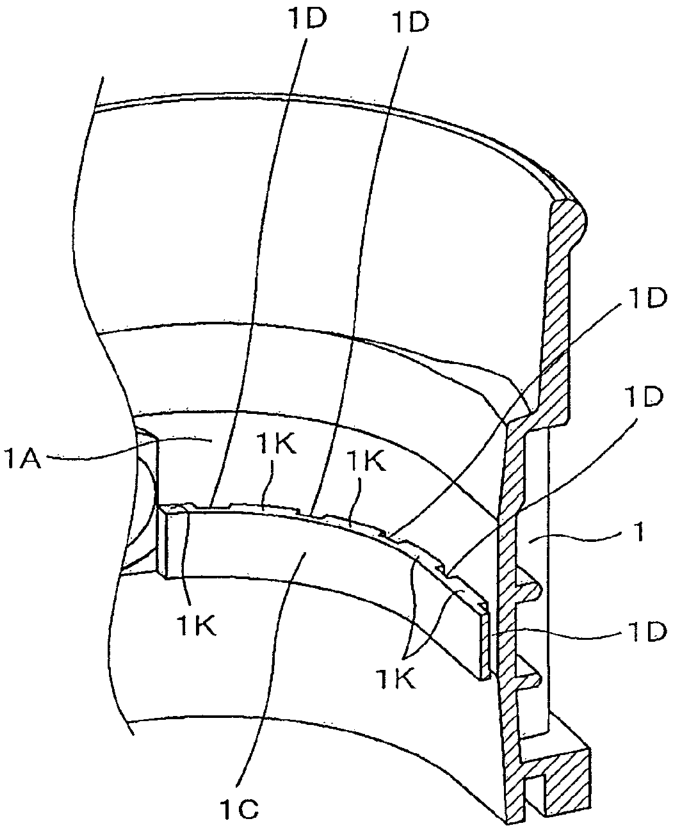
FIG. 16 is a diagram illustrating a shape of a throttle body's internal airflow path according to another embodiment of the present invention.
Figure 17:
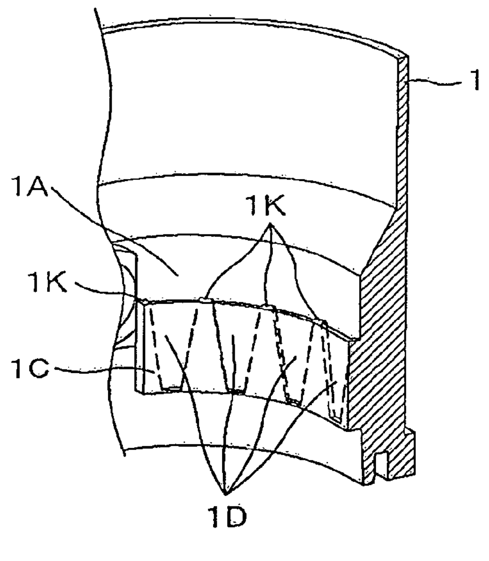
FIG. 17 is a diagram illustrating a shape of an airflow path according to another embodiment of the present invention.
Figure 18:
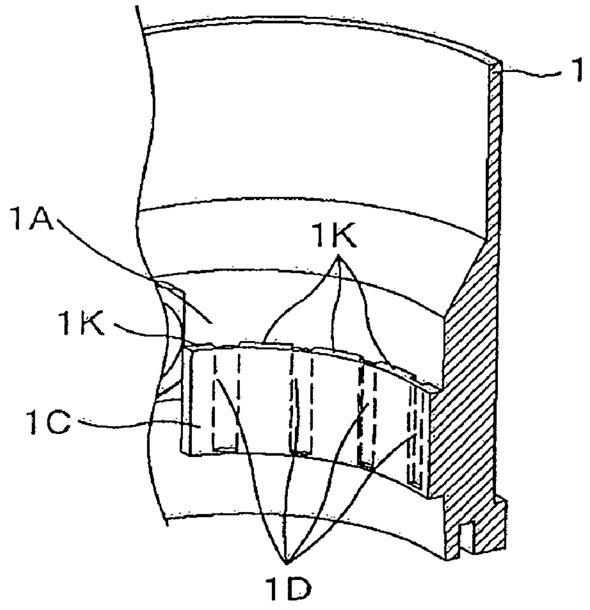
FIG. 18 is a diagram illustrating a shape of an airflow path according to another embodiment of the present invention.
Figure 19:
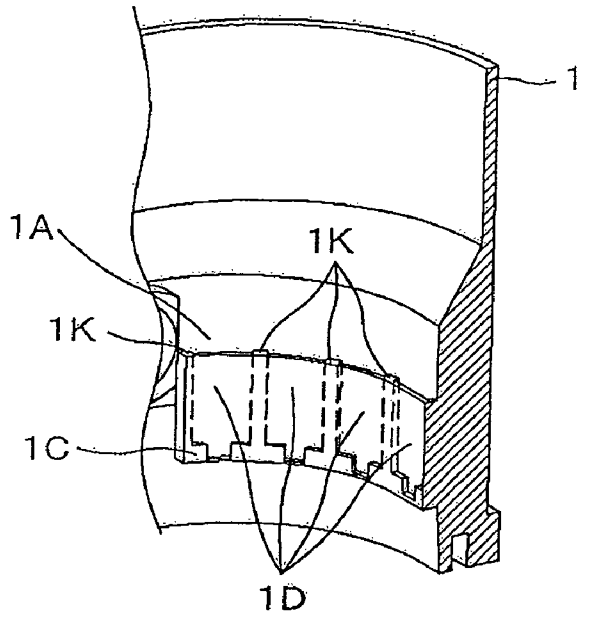
FIG. 19 is a diagram illustrating a shape of an airflow path according to another embodiment of the present invention.

FIG. 16 is a diagram illustrating still another embodiment of the present invention. Even if the throttle body's internal airflow path 1A is provided with the projection 1C on the inside thereof, if the throttle valve 2A opens at the minute opening, the projection 1C may also be provided with a slit 1D as shown in FIG. 16 as a method for decreasing the fluctuations in airflow on the downstream side as shown in FIG. 8. As shown in FIG. 17, the slit 1D may also be provided with a taper in a flow path direction; or as shown in FIG. 18, the slit 1D may also be kept straight. In addition, as shown in FIG. 19, the slit 1D may also be so configured that the entrance side of the slit 1D becomes larger, whereas the exit side of the slit 1D becomes smaller, so that a step is formed therebetween. The size of each slit is determined on the basis of the equalization of the required flow, and from the leakage airflow.

Fourth Embodiment

In order to prevent the projection 1C from sticking to the throttle valve plane 2H due to for example deposit, which was described in the first and third embodiments, a coating agent, which hardly stains, or which is easy to be peeled off even if it stains, may also be applied to one or both of the throttle body's internal airflow path 1A and the throttle valve 2A. For example, fluorine resin film is applied to one or both of the throttle body's internal airflow path 1A and the throttle valve 2A. Because the coating agent is applied after the throttle device is assembled, the coating agent enters a minute gap between the throttle body's internal airflow path 1A and the throttle valve 2A. This also produces effects of reducing the leakage airflow when the throttle valve 2A is located at a low opening position, including at a full-closed position.

Fifth Embodiment

Figure 20:
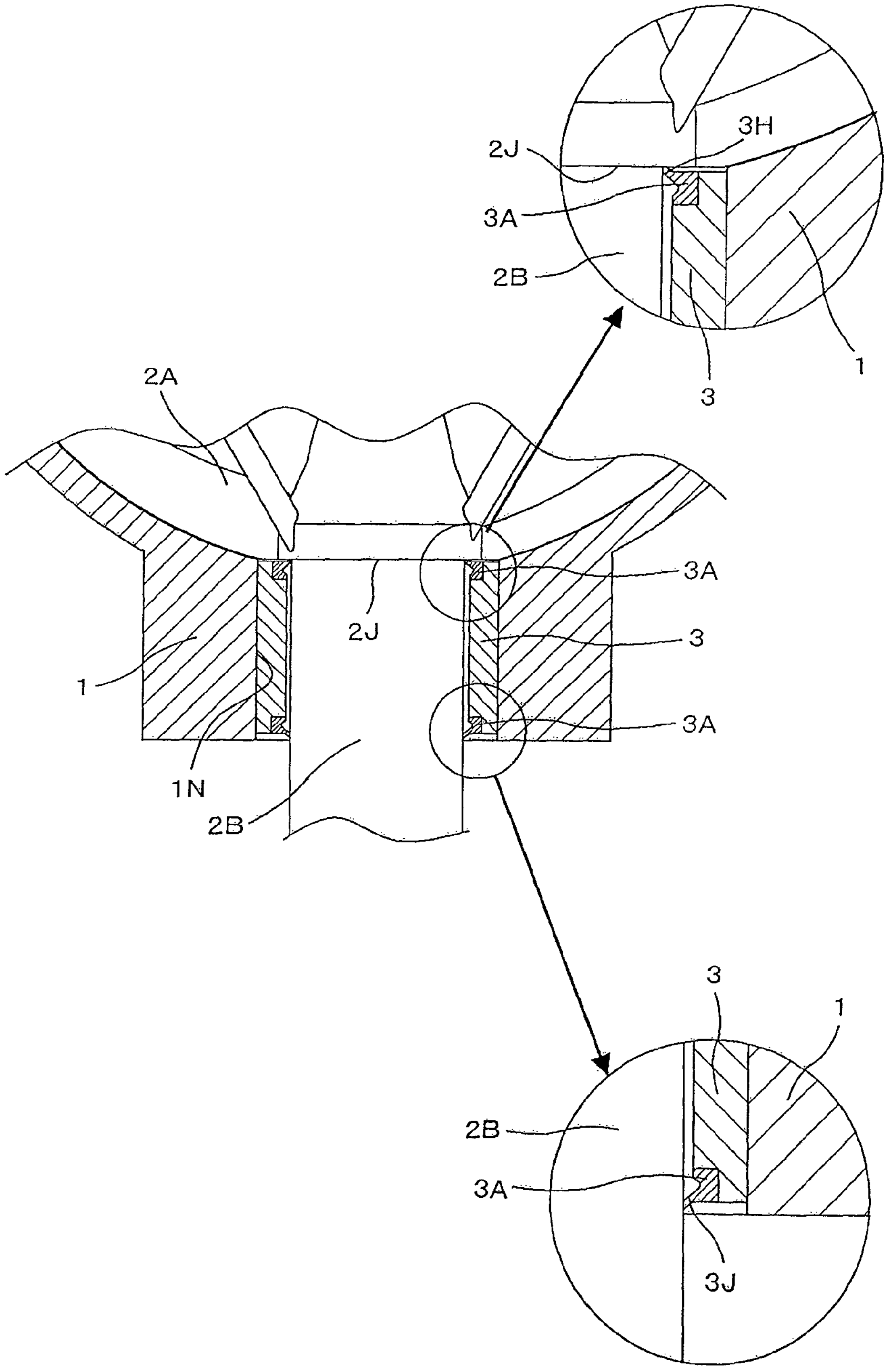
FIG. 20 is a diagram illustrating slide bearings according to another embodiment of the present invention.

FIG. 20 is a diagram illustrating a further embodiment of the present invention. As shown in FIG. 1, the slide bearings 3 are secured to the throttle body 1 at both ends of the throttle body's internal airflow path 1A by insert molding, press fitting, or the like, so that the throttle shaft 2B is rotatably supported. The slide bearings 3 are made of resin. The sealing member 3A is provided on one side or both sides of the slide bearings 3. The sealing member 3A is an elastic body by integral molding or welding. This sealing member 3A is set in such a manner that some amount of tension is maintained between the sealing member 3A and an outer circumferential surface of the throttle shaft 2B. As a result, it is possible to prevent air from leaking from an area around the slide bearings 3 of the throttle shaft 2B.

Sixth Embodiment

Figure 21:
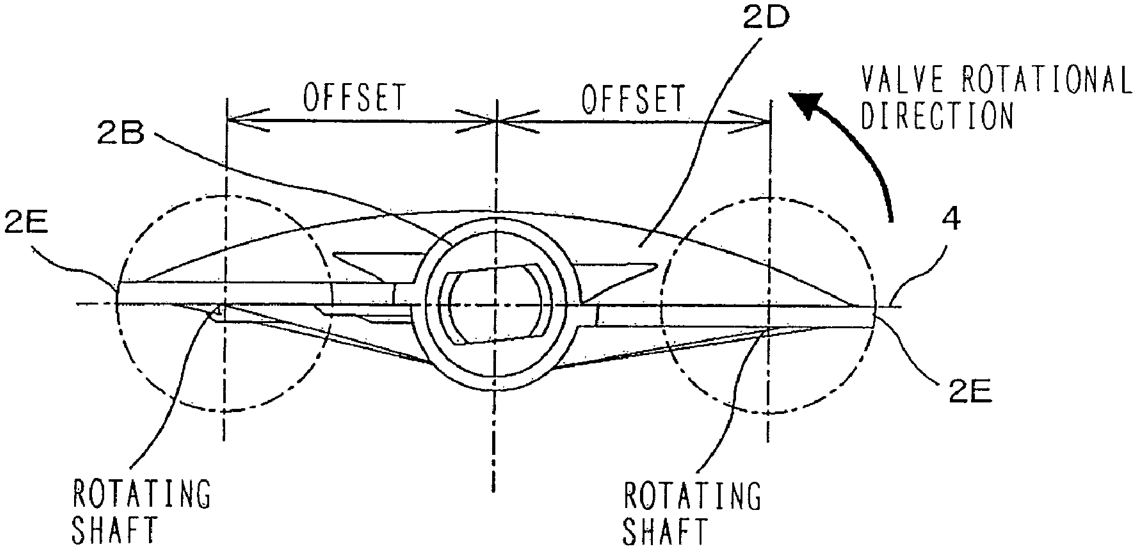
FIG. 21 is a side view illustrating a shape of a throttle valve according to another embodiment of the present invention.
Figure 22:
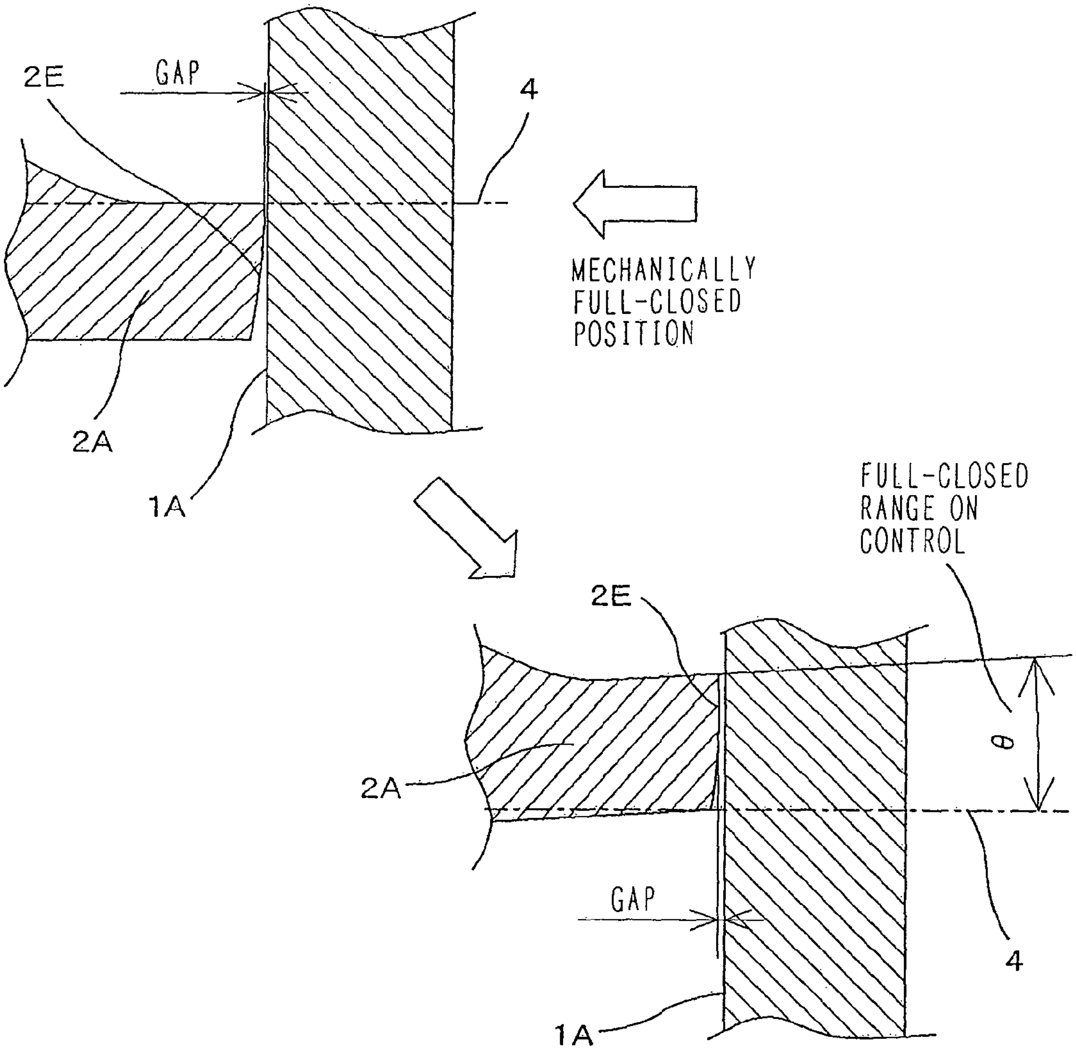
FIG. 22 is a diagram illustrating a throttle valve at low opening according to another embodiment of the present invention.

FIG. 21 is a diagram illustrating a further embodiment of the present invention. When the throttle valve 2A opens at minute opening from the full-closed position, the increase in airflow does not change in the example described in the first embodiment. However, if the small increase in leakage airflow with respect to the opening of the throttle valve 2A is determined, when the throttle valve side surface 2E of the throttle valve 2A forms a shape of a spherical surface and a cylindrical surface, the rotation axis is shifted from the axis of the throttle shaft 2B to the side of the side surface 2E of the throttle valve 2A on the reference plane 4 without changing the most external shape of the throttle valve 2A. If this shape is adopted, when the throttle valve 2A rotates until the throttle valve 2A reaches θ, by adjusting the offset of the rotating shaft, it is possible to change a gap between the throttle body's internal airflow path 1A and the throttle valve side surface 2E as shown in FIG. 2 so that the increased amount of leakage air is controlled with respect to the opening of the throttle valve 2A (an air gap between the throttle body's internal airflow path 1A and the throttle valve 2A at a point of time when the throttle valve 2A reaches 0 becomes larger with the increase in offset).

Seventh Embodiment

Figure 23:
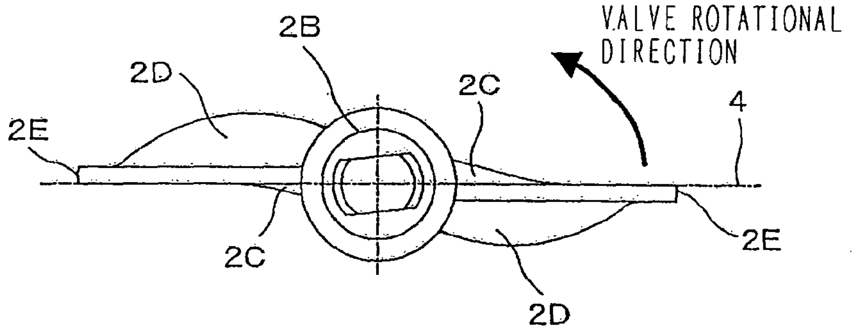
FIG. 23 is a diagram illustrating a shape of a throttle valve according to another embodiment of the present invention.
Figure 24:
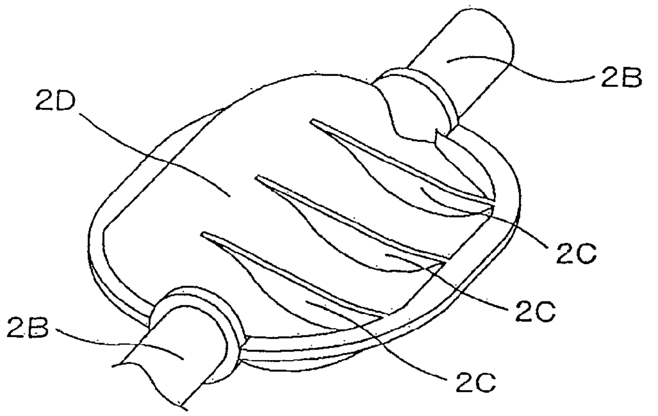
FIG. 24 is a perspective view illustrating a shape of a throttle valve according to another embodiment of the present invention.
Figure 25:
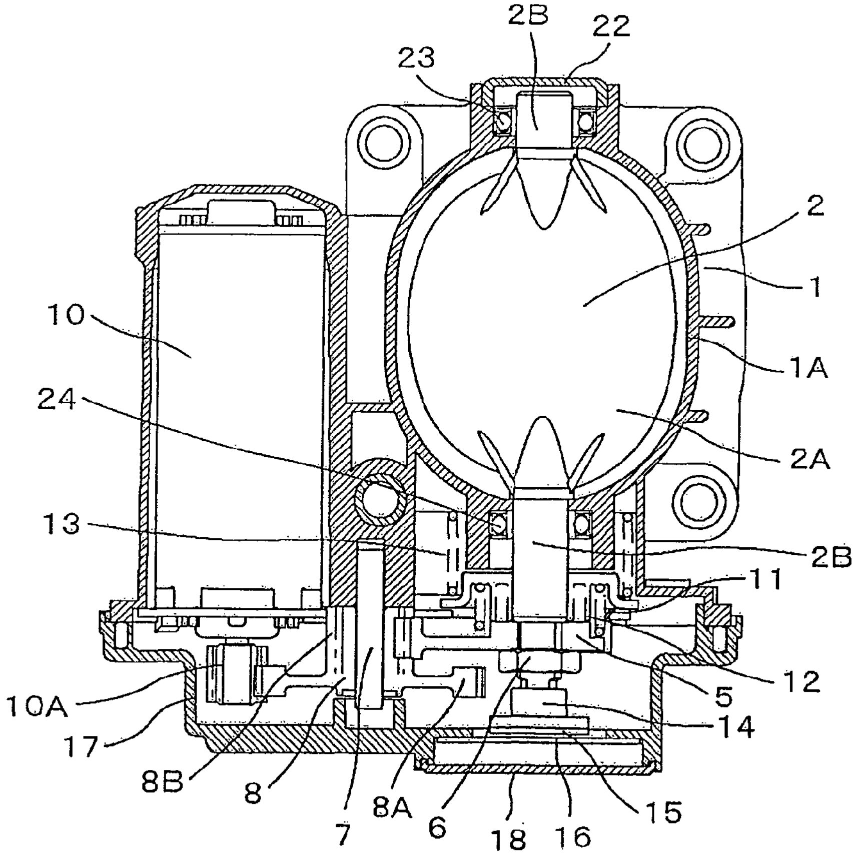
FIG. 25 is a diagram illustrating bearings according to another embodiment of the present invention.

As described in the first embodiment, when the throttle valve 2A is located at a mechanically full-closed position at which the throttle valve 2A is vertical to the throttle body's internal airflow path 1A, if the throttle valve side surface 2E is located on the opposite side of a direction in which the throttle valve 2A rotates with respect to the reference plane 4 that passes through the rotation axis of the throttle shaft 2B, and that is vertical to the throttle body's internal airflow path 1A, it is possible to achieve the effects of controlling the amount of leakage air at a low opening position of the throttle valve 2A, or the effects of reducing the increased amount of leakage air. If it is possible to ensure the strength of the throttle valve 2A, the throttle valve surface 2D may also have another shape, for example, a shape as shown in FIG. 23, and that as shown in FIG. 24.

When an exhaust gas is flowed back in a diesel internal combustion engine, a throttle valve is so controlled that the throttle valve is kept in a closed state to generate the required negative pressure. In addition, in the case of a gasoline internal combustion engine, when the gasoline internal combustion engine is kept in an operational state (for example, idling driving), a throttle valve is so controlled that the throttle valve is kept in a low opening state. Thus, when the throttle valve 2A is controlled so that the throttle valve 2A is located in an area in proximity to a full-closed position, in the case of both diesel and gasoline internal combustion engines, the high negative pressure occurs in the downstream of the throttle valve 2A.

This negative pressure acts on a throttle valve, which causes a load to be put on bearings.

In particular, when an internal combustion engine equipped with a supercharger is used, not only the intake negative pressure but also the charging pressure acts on a valve, which causes a load put on the valve to increase.

In addition, in the case of the internal combustion engine whose displacement is large, the cross sectional area of an intake path is large, and accordingly, the area of a valve becomes large. This causes a load put on a valve to increase, and also causes a load put on bearings to increase.

Thus, when the cross sectional area of the airflow path 1A inside the throttle body becomes larger, with the result that the area of the throttle valve 2A becomes larger, it is necessary to increase the strength of the bearings of the throttle valve 2A, and the strength of thin wall parts of the throttle valve 2A, so as to prevent loaded parts from being deformed or damaged.

As measures against the above, by thickening the throttle valve 2A, it is possible to increase the strength thereof. However, in this case, there is the following problem: because the weight of the throttle valve 2A increases, an electronically controlled throttle device becomes heavier; or because the valve has a thick wall, pickets occur at the time of resin molding, and accordingly, it is difficult to achieve the dimensional accuracy of the valve. Moreover, there also arises a problem that a pressure loss at the time of a full-opened position increases.

Figure 28:
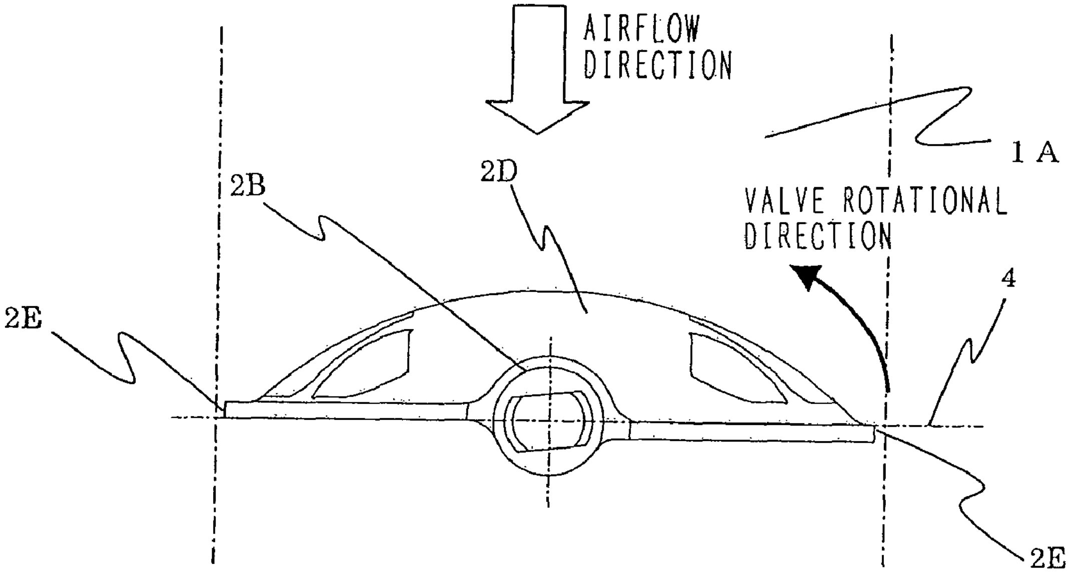
FIG. 28 is a diagram illustrating bearings according to another embodiment of the present invention.
Figure 29:
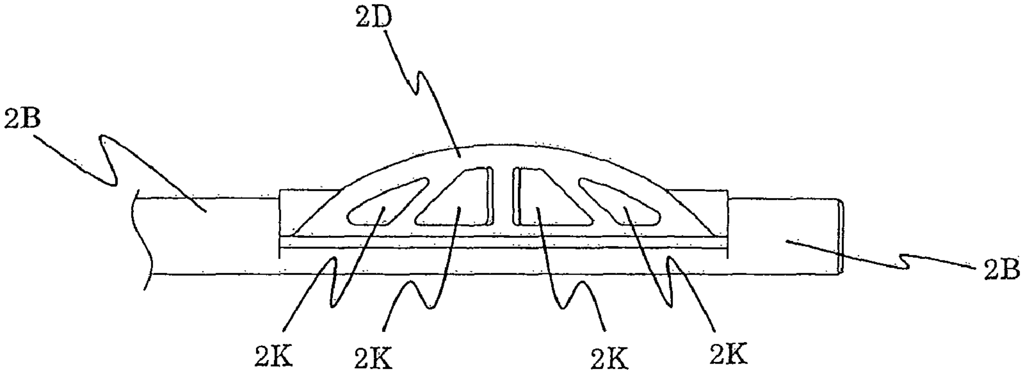
FIG. 29 is a diagram illustrating bearings according to another embodiment of the present invention.

In order to ensure the strength of the throttle valve 2A without increasing the weight of the throttle valve 2A, or without increasing a pressure loss at the time of a full-opened position, the throttle valve 2A is provided with a plurality of through holes 2K as shown in FIGS. 28, 29. When the throttle valve 2A is located at a full-opened position, these through holes 2K produce the effects of not only reducing the weight but also reducing the pressure loss if the throttle valve 2A is provided with the through holes 2K in a direction in which the airflow passes.

Incidentally, as shown in FIG. 28, when the throttle valve 2A is located at a mechanically full-closed position at which the throttle valve 2A is vertical to the throttle body's internal airflow path 1A, as is the case with the first embodiment, if the side surface 2E of the throttle valve 2A is located on the opposite side of a direction in which the throttle valve 2A rotates with respect to the reference plane 4 that passes through the rotation axis of the throttle shaft 2B, and that is vertical to the throttle body's internal airflow path 1A, it is possible to achieve the effects of controlling the amount of leakage air at a low opening position of the throttle valve 2A, and the effects of reducing the increased amount of leakage air.

Eighth Embodiment

FIG. 7 is a diagram illustrating still a further embodiment of the present invention. If the internal combustion engine equipped with the supercharger, and the throttle body's internal airflow path 1A, have a large diameter, the surface pressure applied to the slide bearings 3 is large, which makes it difficult to structure bearings that support the throttle shaft 2B (the allowable surface pressure of a material of the slide bearings 3 is exceeded, or as a result of it, an allowable value of a PV value is exceeded). In addition, if the surface pressure becomes high, the frictional force increases, which causes the friction of the throttle shaft 2B to increase. Therefore, there is a possibility that the throttle valve 2A will not successfully return. In this case, rolling bearings are used. This is because an allowable load of the rolling bearings is high, and because the increase in friction of the rolling bearings is small even at the time of a high load. For example, ball bearings having a sealing function 23 are used. On the side of the gear cover 17, the ball bearings having a sealing function 23 are press-fit into the throttle shaft 2B and the throttle body 1 on both inner and outer rings, whereas on the opposite side of the gear cover 17, the ball bearings having a sealing function 23 are loosen from the throttle shaft 2B, and are press-fit into the throttle body 1, so that the throttle shaft 2B is rotationably supported.

Ninth Embodiment

Figure 26:
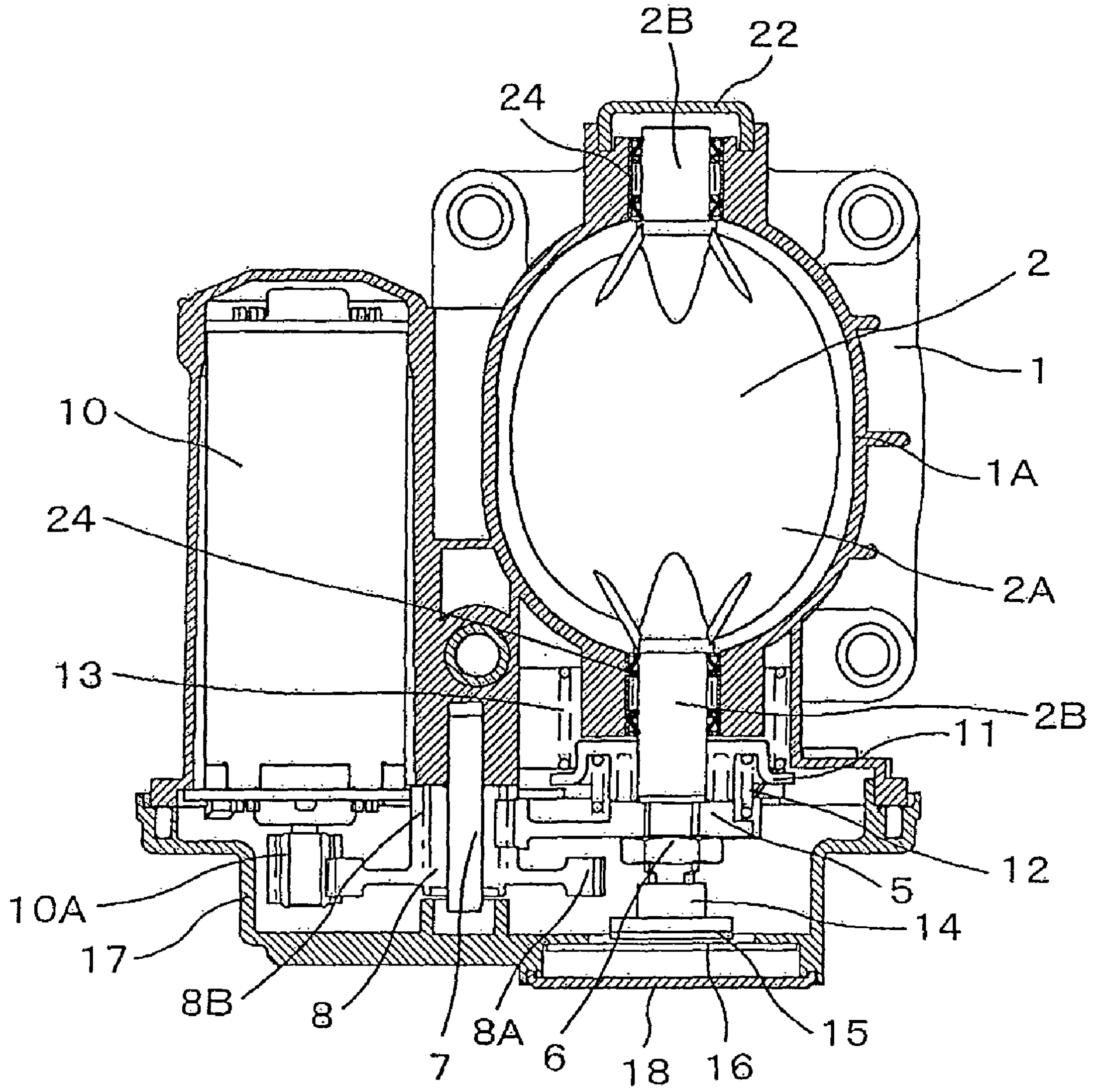
FIG. 26 is a diagram illustrating bearings according to another embodiment of the present invention.

FIG. 26 is a diagram illustrating yet another embodiment of the present invention. If the internal combustion engine equipped with the supercharger, and the throttle body's internal airflow path 1A, have a large diameter, the surface pressure applied to the slide bearings 3 is large, which makes it difficult to structure bearings that support the throttle shaft 2B (the allowable surface pressure of a material of the slide bearings 3 is exceeded, or as a result of it, an allowable value of a PV value is exceeded). In addition, if the surface pressure becomes high, the frictional force increases, which may cause the friction of the throttle shaft 2B to increase. In such a case, needle bearings having a sealing function 24 may also be used. The needle bearings having a sealing function 24 are press-fit into the throttle body 1 so that the throttle shaft 2B is rotationably supported.

Tenth Embodiment

Figure 27:
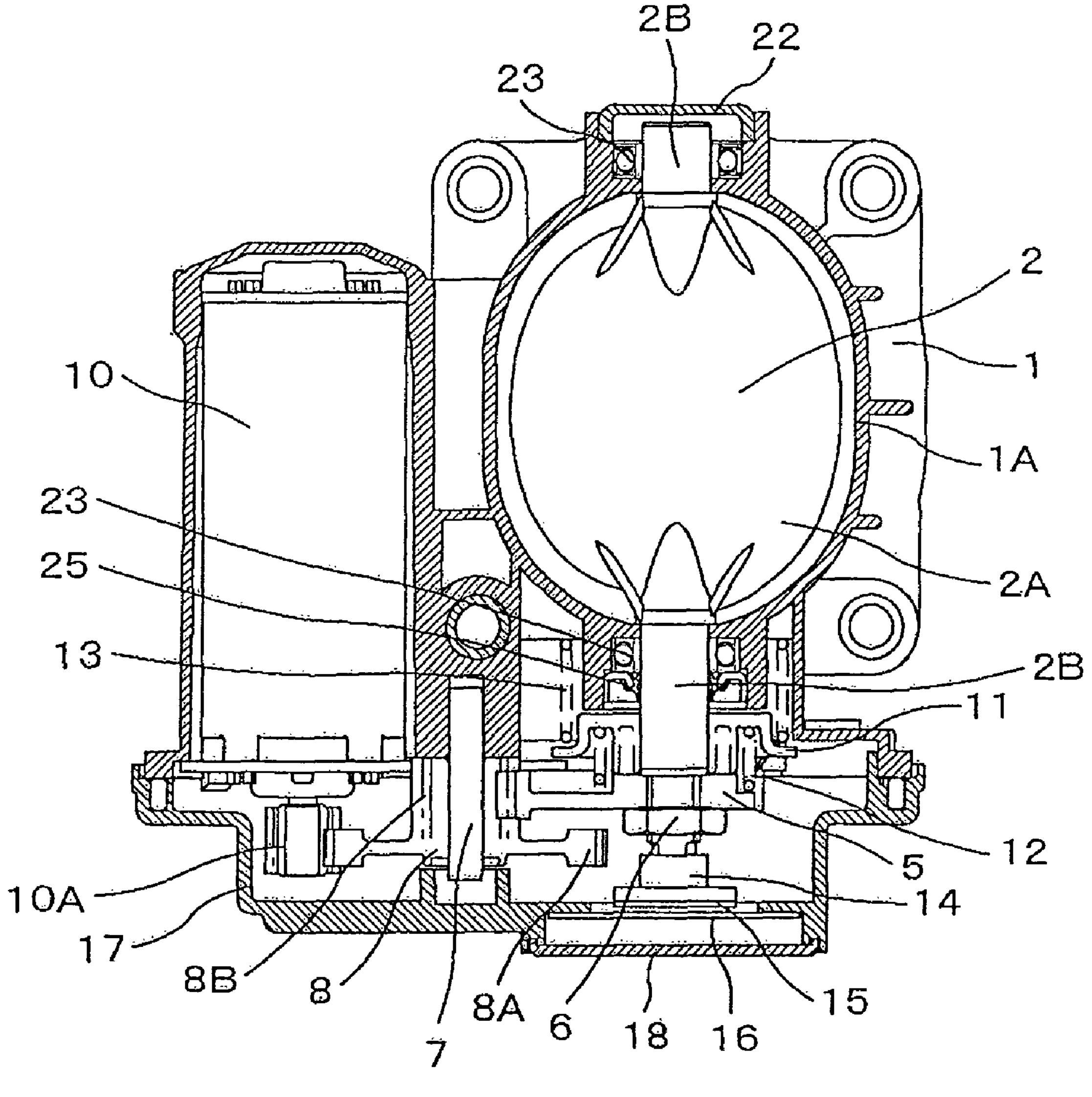
FIG. 27 is a diagram illustrating bearings according to another embodiment of the present invention.

FIG. 27 is a diagram illustrating yet still another embodiment of the present invention. In the first, eighth, and ninth embodiments, although the bearings for supporting the throttle shaft 2B are provided with a sealing function, the sealing function may also be eliminated from the bearings so that a seal ring having a sealing function 25 is separately mounted to the outside of the bearings (the outside of the throttle body's internal airflow path 1A). An outer circumferential material of the seal ring 25 is metal or resin. On the other hand, an inner sealing material is an elastic member such as rubber. In this case, the slide bearings 3 are made of resin in the first embodiment. However, because the insert molding or welding of a sealing member is not required, shaft bushing with back metal, sintering shaft bushing, a cylindrical shaped smooth steel material with high hardness, or a material to which a coating agent with high hardness is applied, may also be adopted. The coating with high hardness is, for example, hard chromium or DLC.

Eleventh Embodiment

The above description is based on the assumption that the throttle body 1 and the throttle valve shaft 2 are made of resin. However, it may also so devised that the throttle body 1 is made of metal as before, and the throttle valve 2A and the throttle shaft 2B are also made of metal as before, with the throttle valve 2A and the throttle shaft 2B formed separately from each other. For example, the throttle body 1 is made of aluminum die casting, the throttle valve 2A is made of brass, and the throttle shaft 2B is made of steel. In addition, in this case, because it is not necessary to suppress a gap between the throttle body's internal airflow path 1A and the throttle valve shaft side surface 2E so strictly as before (even if the gap is kept at the conventional level or more, required leakage airflow characteristics at low opening are achieved), it is possible to lower the machining precision (for example, the machining time is shortened by increasing the tool feed speed), and only presswork without performing machining may also suffice.

Moreover, it may also be so combined that among the throttle body 1, the throttle valve 2A, and the throttle shaft 2B, one or more parts are made of resin, and the other parts are made of metal.

Twelfth Embodiment

In the above-described embodiments, an inductive type (electromagnetic inductive type) noncontact sensor is taken as an example of the sensor for detecting the opening of the throttle valve 2A. However, a different type of noncontact or contact sensor may also be adopted. In particular, in the case of an inductive type noncontact sensor or a noncontact sensor that uses a Hall IC, if the throttle shaft 2B is made of resin, the throttle shaft 2B exerts no influence upon the sensor output. Accordingly, it is not necessary to keep the noncontact sensor spaced away from the tip of the throttle shaft 2B, which enables a compact layout.

The motor-driven electronically controlled throttle device according to the first embodiment, which is shown in FIG. 1, FIGS. 12 through 14, and in the description thereof, is used as a basic configuration. In addition, a shape of the throttle valve shaft, which is shown in FIGS. 1 through 4, FIG. 15, FIGS. 21 through 24, and in the description thereof, a shape of the bore (intake path) inner wall surface, which is shown in FIG. 6, FIG. 7, FIGS. 16 through 19, and in the description thereof, and a configuration of the shaft sealing member, which is shown in FIG. 11, FIG. 20, and in the description thereof, can be properly combined.

To be more specific:

1) in order to control the change in Qa caused by bending of the shaft, the throttle valve shaft and the airflow path (bore) are configured to have a shape of an ellipse, and a half round portion located in the downstream direction on the counter-rotation side of the ellipse is half round or partially provided with a projection extending in a radial direction, and the area is seated at the lower outer edge of the valve;

2) if the above-described 1) is further provided with a seal of the shaft, it is possible to further reduce Qa in a low opening area; and 3) if the above-described 1), 2) are further provided with a curved surface having the specific curvature in a peripheral surface thickness direction of the valve, it is possible to decrease Qa in the low opening area over a wide range of area.

The characteristics of the above-described embodiments will be summarized as below.

1) As a method for, when the throttle valve is fully closed, or when the throttle valve is slightly opened from a full-closed state, decreasing the leakage airflow from a throttle body's internal airflow path, and from a throttle valve, a projection is provided inside the throttle body's internal airflow path, which has a shape formed along a gap between the throttle body's internal airflow path and the throttle valve side surface, only in a direction in which when the throttle valve rotates in an open direction about a throttle shaft axis, the projection gets away on the downstream side of the throttle valve (on the side near from a combustion chamber) that is more effective from a viewpoint of bending of the throttle valve caused by the air pressure applied to the throttle valve, so that the projection contacts the throttle valve surface. If the above-described method is used, the aperture area becomes smaller in an area in which a gap between the internal airflow path and the throttle valve side surface is smaller than a gap between the projection inside the internal airflow path and the throttle valve surface. This causes the leakage airflow to decrease.

For the shape and providing position of the projection, in order to reduce the fluctuations in airflow on the downstream side of the throttle valve, which is a secondary evil, the projection is provided on only the throttle shaft side of the internal airflow path. As a result, the fluctuations in airflow are reduced. In addition, in an area in proximity to the throttle shaft, the sensitivity to the increase in distance between the projection and the throttle valve surface with respect to the opening of the throttle valve 2A is the lowest. Therefore, the effects of the projection continue up to the same opening as that achieved when the projection is provided on the whole half round portion. Moreover, if the projection is provided on the whole half round portion, the leakage airflow extremely decreases only at the full-closed position. This largely differs from the leakage airflow at the opening that depends on only the gap between the internal airflow path and the throttle valve side surface, at which the effects of this projection are lost. As a result, the change in airflow becomes large between the full-closed position and the opening that depends on only the gap between the internal airflow path and the throttle valve side surface. However, if the projection is provided on only the throttle shaft side, the decrease in leakage airflow at the full-closed position becomes moderate. Therefore, the increase in airflow before reaching the opening that depends on only the gap between the internal airflow path and the throttle valve side surface does not become extreme as described in the first embodiment.

2) As above, decreasing means for decreasing the airflow leaking from a gap between the throttle body internal path and the throttle valve side surface was described. Besides this, air flows from the upstream to the downstream with respect to the throttle valve through a slight gap of a shaft (between the throttle shaft circumference and the throttle body bearings). When the throttle valve is fully closed, or when the throttle valve is slightly opened, the influence exerted upon the leakage airflow cannot be ignored. A portion which rotationally supports the throttle shaft of the throttle body is provided with slide bearings made of, for example, resin. The slide bearings are secured by press fitting or welding. These slide bearings are formed by mounting a sealing member (elastic body) in an area in proximity to the throttle body's internal airflow path by integral molding, or by welding thereafter. As a result, it is possible to prevent air from leaking from the shaft, and to reduce the leakage airflow of the throttle device of the internal combustion engine as a whole. In particular, the effects are high in a low opening area including a full-closed position, in which the leakage airflow is small.

3) If the throttle valve is configured to have spherical and cylindrical shapes with the throttle shaft applied as the rotation center axis, when the throttle valve opens, it is possible to keep the distance between the throttle body's internal airflow path and the side surface of the throttle valve constant over the entire perimeter at low opening. Accordingly, the aperture area does not increase. As a result, the airflow at a control-based full-closed position, at which the throttle valve is slightly opened from a mechanically full-closed position, does not increase. Therefore, it is possible to make the leakage airflow at the control-based full-closed position lower than before. In addition, when the internal combustion engine is kept in an idling state, the throttle valve opening is set in an area at the control-based full-closed position or more. However, this structure makes it possible to keep the aperture area constant even at the throttle valve opening of the idling rotation, and to use an area in which the leakage airflow does not increase, or an area that is near from the area in question. Therefore, it is easy to set a throttle valve opening position at which the airflow can achieve the required idling revolution speed, and accordingly the controllability is also improved.

4) If the distance between the throttle body's internal airflow path and the side surface of the throttle valve is kept constant in the throttle valve described in 3) so as to increase the opening area in which the airflow does not increase, when the throttle valve side surface is located at a throttle valve full-closed position, a portion in which the throttle valve side surface is located on the throttle valve rotation side with respect to a surface which passes through the center of the throttle shaft, and which is vertical to the throttle body's internal airflow path, is always located in a direction which gets away from the throttle body's internal airflow path when the throttle valve rotates about the throttle shaft. Accordingly, the aperture area increases, which is meaningless. For this reason, the throttle valve side surface is located on the opposite side of the direction in which the throttle valve rotates, including a surface that passes through the center of the throttle shaft, and that is vertical to the throttle body's internal airflow path. This method makes it possible to, when the throttle valve is located at a full-closed position, keep the aperture area constant until a point which is the furthest from a surface passes through the surface in question. The surface passes through the center of the throttle shaft, and is vertical to the throttle body's internal airflow path. As a result, it is possible to increase the opening area in which the airflow does not increase. If this shape is adopted, it is easier to set a throttle valve opening position at which the airflow can achieve the required idling revolution speed, and accordingly the controllability is also improved.

Preferred modes of the present invention will be described as below.

First Mode

In an electronically controlled throttle device used for an internal combustion engine, only an area in proximity to a shaft hole of a throttle shaft of a throttle body's internal airflow path is provided with a projection having a shape extending along a gap between the throttle valve and the throttle body's internal airflow path on the downstream side of the throttle valve (on the side near from a combustion chamber), only in a direction in which when the throttle valve rotates in an open direction with the axis of the throttle shaft applied as the center, the projection gets away.

Second Mode

An electronically controlled throttle device used for an internal combustion engine has a structure in which: both or one of slide bearings, which rotationally support a throttle shaft at both ends of a throttle body's internal airflow path, are made of resin; a sealing member (elastic body) is provided by integral molding, or by welding in an area in proximity to the throttle body's internal airflow path of the slide bearings made of resin thereafter; the throttle shaft is provided with a surface, which is orthogonal to the axis of the throttle shaft, in an area in proximity to the throttle body's internal airflow path; and an area in proximity to the axis is sealed by this surface and a sealing member of the slide bearings made of resin.

Third Mode

An electronically controlled throttle device used for an internal combustion engine includes a throttle body's internal airflow path, and a throttle valve that is rotationally located therein. The throttle valve has spherical and cylindrical shapes on the outer circumferential side with the rotational axis of the shaft applied as the center. As a result, when the throttle valve opens, it is possible to keep the area of a gap between the throttle body's internal airflow path and the side surface of the throttle valve constant when the throttle valve is located in a low opening area. Therefore, it is possible to suppress the increase in leakage airflow, and to improve the controllability at the time of the idling rotation.

Fourth Mode

In the throttle valve according to the third mode, a position at which the throttle valve is fully closed is a position at which the throttle valve is located in an direction that is vertical to the throttle body's internal airflow path; a portion which forms a throttle valve side surface includes a surface that passes through the rotation axis of the throttle shaft, and that is vertical to the throttle body's internal airflow path; and the portion is located on the opposite side of a direction in which the throttle valve rotates. As a result, it is possible to suppress the increase in leakage airflow at low opening, and to improve the controllability at the time of the idling rotation.

Fifth Mode

The electronically controlled throttle device used for an internal combustion engine according to the modes 1 through 4 includes a throttle valve having an ellipse shape, and a throttle body's internal airflow path having an ellipse shape, in which a rotational axis direction of the throttle valve, which is located in the throttle body's internal airflow path, is a longitudinal direction.

Sixth Mode

In the electronically controlled throttle device used for an internal combustion engine according to the modes 1 through 5, all of the throttle body, the throttle valve, and the throttle shaft, or one of them or more, are formed of a resin molded material.

The effects of the above-described modes will be described as below.

The leakage airflow occurring when the throttle valve is located at a full-closed position can be reduced by adopting one of the above-described methods, or by combining both.

The leakage airflow occurring when the throttle valve is located at a control-based full-closed position can be reduced by adopting the second mode. In addition, by adopting the third mode, it is possible to prevent the leakage airflow at a full-closed position from increasing. As a result, it is possible to reduce the leakage airflow at the control-based full-closed position. In another case, by combining both of the third and fourth modes, a range within which it is possible to prevent the leakage airflow from increasing becomes wider. Accordingly, the flexibility of the control-based full-closed position is increased. Further, if not only the third and fourth modes but also the second mode are combined, the effect of reducing the leakage airflow becomes higher.

The leakage airflow occurring when the throttle valve is located in a low opening area can be kept constant at a minimum value by adopting the third mode. By using the low opening area, or an area around the low opening area, as an idling position, it is possible to improve the controllability of the opening of the throttle valve. Moreover, by further combining one of the first, second, third, and fourth modes, it is possible to further reduce the leakage airflow, and to adjust the minimum airflow with high accuracy. In particular, if the third mode is combined with the fourth mode, an opening area in which the airflow is kept constant at a minimum value is widened. Accordingly, it is possible to improve the controllability of the opening of the throttle valve at an idling position.

According to these modes, a throttle device used for an internal combustion engine is configured to include the throttle body, the throttle shaft, and the throttle valve, which are made of resin, so that the weight saving is achieved. In addition to it, because the accuracy in shape of the throttle body's internal airflow path, and that of the throttle valve side surface, are low, even if the distance between both of them is made longer so that the interference including the deformation and variation after resin molding does not occur, it is possible to reduce the minimum airflow at the full-closed position to a low level, and to reduce, to a low level, the airflow in a slight opening area including the control-based full-closed position at which the throttle valve is slightly opened from the full-closed position. Moreover, since a simple method that performs only resin molding is used, as airflow characteristics achieved when the opening of the throttle valve is possible to reduce the increase in leakage airflow with respect to the throttle valve opening, and thereby to improve the controllability of the opening of the throttle valve in an idling area.

The concepts of the present invention will be summarized corresponding to the reference numerals of the embodiments as below.

When the valve (2) is located at a full-closed position (a position designated by reference numeral 4 on the upper side of the diagram shown in FIG. 5) facing a plane (2H) that is formed on a peripheral lower surface of a semicircular portion with respect to a rotating shaft (2B) of a butterfly valve (2) made of resin, an annular projection (1C) radially inwardly extends towards an inner wall surface of a fluid path (1), the annular projection (1C) including a plane (1K) that contacts the plane (2H), which is formed on a peripheral lower surface of the valve (2), so as to form a fluid seal. As a result, the fluid negative pressure occurring on the downstream of the valve produces such force that the valve (2) is pushed to (attracted) a seal surface (1K). Therefore, it is possible to sufficiently ensure sealing characteristics at the time of shutting the valve.

To be more specific, the annular projection (1C) is formed in an area ranging from a pair of bearings for supporting the rotating shaft (2B) of the valve (2) to a specific area in a circumferential direction. The remaining area including a position, whose distance from the pair of bearings (1N) becomes equivalent in the circumference direction, includes the lacking part (also including 1M, a slit 1D) of the projection. While the valve (2) is pressed down to the seal surface (1K), or even when the valve (2) is spaced away from the seal surface (1K) to open, the leakage airflow from a minute gap (G1) between the valve peripheral surface (2E) and the fluid path inner wall surface (1A) in the lacking part (also including 1M, the slit 1D) little changes until the specific opening is exceeded. As a result, even when the valve (2) gets away from the seal surface (1K) to open, the airflow does not suddenly increase. To be more specific, an inflection point does not occur in airflow characteristics. Therefore, the control is stabilized.

To be more specific, within the range of the lacking part (also including 1M, the slit 1D), an area between the periphery (2E) of the valve (2) and the inner circumferential wall surface (1A) of the fluid path, which faces the periphery (2E), includes a minute gap (G1) used to adjust the minimum airflow.

Preferably, the periphery (2E) of the valve (2) is formed as a curved surface (2E) having the specific curvature in a thickness direction.

As another specific configuration, the annular projection (1C) is formed over a specific range in a circumferential direction from the pair of bearings (1N) that support the rotating shaft (2B) of the valve (2). The remaining area is alternately formed with the projection (1C) and the projection lacking part (also including 1M, slit 1D).

Preferably, only a position facing the peripheral lower surface of a semicircular portion with respect to the rotating shaft (2B) of the valve (2) made of resin is formed with the projection (1C). The remaining semicircular portion includes a minute gap (G1), which is used to adjust the minimum airflow, between the periphery (2E) of the valve (2) and the fluid path inner wall surface (1A). As a result, when the plane (2H) on the lower side of the valve (2) is spaced away from the seal surface (1K) to open, the minute gap (G1) between the peripheral surface (2E) of the valve (2) and the fluid path wall surface (1A) is kept substantially constant within a specific minute angle range (for example, about the thickness θ of the valve).

Preferably, if the periphery (2E) of the valve (2) is formed as the curved surface (2E) having the specific curvature in a thickness direction of the valve over the entire perimeter, it becomes easier to keep the minute gap constant.

More preferably, a shape of the curved surface of the periphery (2E) of the valve (2) is set in such a manner that while the valve (2) opens by the thickness thereof from the mechanically full-closed position (a position indicated on the upper side of the diagram in FIG. 5) from which the valve (2) cannot mechanically rotate any more in a close direction (the range indicated on the lower side of the diagram in FIG. 5), the specified minimum airflow is achieved at the mechanically full-closed position.

In addition, in order to achieve the above-described object, according to another aspect of the present invention, cylindrical elastic sealing members (3, 3A, 3B) are mounted about the rotating shaft (2B) in a bearing hole (1N); and the edge (3H) on the fluid path side of the sealing members (3, 3A, 3B) elastically contacts an annular surface (2J) formed at a position facing the bearing hole (1N) about the rotating shaft of the valve.

Preferably, when the valve is located at a full-closed position (the position designated by reference numeral 4 on the upper side of the diagram shown in FIG. 5) facing the peripheral lower surface (2H) of a semicircular portion with respect to a rotation axis (2B) of a butterfly valve (2) made of resin, an annular projection (1C) radially inwardly extends towards an inner wall surface of a fluid path (1), the annular projection (1C) including a plane (1K) that contacts the peripheral lower surface (2H) of the valve (2) to form a fluid seal. Moreover, cylindrical elastic sealing members (3, 3A, 3B) are mounted about the rotating shaft (2B) in a bearing hole (1N); and the edge (3H) on the fluid path side of the sealing members (3, 3A, 3B) elastically contacts the annular surface (2J) formed at a position facing the bearing hole (1N) about the rotating shaft (2B) of the valve.

More preferably, the valve is formed in a rectangular or ellipsoidal shape having four corners, each of which has a R portion having the specific curvature; and a sealing member of the valve peripheral lower surface (2H) in a half round portion of the rotating shaft (2B) is formed with at least two areas: an area up to bearings on one side including at least the R portion on the one side; and an area up to the bearings on the other side including the R portion on the other side (refer to the throttle valve shown in FIGS. 2, 3, and 15).

Incidentally, if a value which is close to a linear expansion coefficient of aluminum is used as a linear expansion coefficient of a resin material used to mold the throttle valve shaft, it is possible to suppress the deformation of the throttle valve shaft caused by heat fluctuations, and to suppress fluctuations in gap, which cause biting, and the leakage airflow.

Preferably, the present invention is applied to a throttle device of a so-called cylinder fuel injection type internal combustion engine that directly injects fuel into a cylinder. However, the present invention can also be applied to an internal combustion engine whose intake port is equipped with a fuel injection unit. In addition, the present invention can also be applied to not only gasoline engine's throttle devices, but also diesel engine's throttle devices.

Moreover, the present invention can also be applied to various kinds of valves for controlling the gas flow, typified by air.

What is claimed is:

1. A butterfly valve device comprising a butterfly valve made of a resin material, said butterfly valve being rotatably supported by a rotating shaft in a fluid path, wherein:

when the butterfly valve is located at a mechanically full-closed position facing a peripheral lower surface of the semicircular portion with respect to a rotating shaft of the butterfly valve, a partial annular projection is adapted to radially inwardly extend towards an inner wall surface of a fluid path, the partial annular projection including a plane that contacts the peripheral lower surface of the valve to form a fluid seal; and a controllable-full-closed position is provided at a position which is opened from the mechanically full-closed position to a full-opened position, and wherein, at the controllable-full-closed position, flow amount of fluid is prescribed by the perimeter side of the butterfly valve and the inner circumference side of the fluid path.

2. The butterfly valve device according to claim 1, wherein:

the periphery of the valve is formed as a curved surface having the specific curvature in a thickness direction.

3. The butterfly valve device according to claim 1, wherein:

the annular projection is provided in an area ranging from a pair of bearings which support the rotating shaft of the valve to a specific area in a circumferential direction, and the remaining area is alternately formed with a projection and a projection lacking portion.

4. The butterfly valve device according to claim 1, wherein:

with the projection is formed at only a peripheral lower surface of a semicircular portion with respect to the rotating shaft of the valve, and in the remaining semicircular portion, an area between the periphery of the valve and the fluid path inner wall surface is formed with a minute gap used to adjust the minimum airflow.

5. The butterfly valve device according to claim 1, wherein:

the periphery of the valve is formed as a curved surface having the specific curvature in a thickness direction of the valve over the entire perimeter.

6. The butterfly valve device according to claim 1, wherein:

while the valve opens only by the thickness thereof from a mechanically full-closed position from which the valve cannot mechanically rotate any more in a close direction, a shape of the curved surface on the periphery of the valve is set in such a manner that the specified minimum airflow is achieved at the mechanically full-closed position.

7. The butterfly valve device according to claim 1, wherein:

the valve is formed in a rectangular or ellipsoidal shape having four corners, each of which has a curved surface having the specific curvature; and a sealing member of the valve peripheral lower surface in a half round portion with respect to the rotating shaft is formed with at least two areas: an area up to bearings on one side including the curved surface on one side; and an area up to the bearings on the other side including the curved surface on the other side.

8. The butterfly valve device according to claim 1, wherein:

the partial annular projection is formed in a specific area ranging from a pair of bearings which support the rotating shaft of the valve to an area in a circumferential direction; and the projection, at least part of which is lacking, extends over a remaining range including a position whose distance from the pair of bearings becomes equivalent in the circumference direction.

9. The butterfly valve device according to claim 8, wherein:

within a range of the lacking part, an area between the periphery of the valve and the inner circumferential wall surface of the fluid path, which faces the periphery, is provided with a minute gap used to adjust the minimum airflow; and the leakage airflow from the minute gap between the valve peripheral surface included in the lacking part and the fluid path inner wall surface is kept substantially constant while the valve is pressed down to a seat surface, and after the valve gets away from the seat surface to open, until the specific opening is exceeded.

10. An electronically controlled throttle device for an internal combustion engine, said electronically controlled throttle device using the butterfly valve device according to claim 1, said electronically controlled throttle device comprising:

a housing having a tubular shape, the housing including a path through which the intake air passes;

a rotating shaft that is rotatably supported by the housing, and that is located in such a manner that the rotating shaft crosses the path; and a butterfly valve type throttle valve that is secured to the rotating shaft, and that is used to adjust the airflow passing inside the housing based on the rotation of the rotating shaft;

wherein:

the rotating shaft and the throttle valve are formed by injection molding of a resin material; and the throttle valve is provided with an airflow path through which air passes from the upstream of the throttle valve toward the downstream across the rotating shaft.

11. The electronically controlled throttle device used for the internal combustion engine according to claim 10, wherein a plurality of airflow paths are provided inside the valve.

12. The electronically controlled throttle device used for the internal combustion engine according to claim 11, wherein:

when the throttle valve is kept in a full-closed state in which the airflow becomes the smallest, the airflow path is formed at a position that is offset on the upstream or downstream side, or both sides, with respect to the central axis of the shaft.

13. The electronically controlled throttle device used for the internal combustion engine according to claim 12, wherein the throttle valve and the rotating shaft are molded as one unit.

14. The electronically controlled throttle device for the internal combustion engine according to claim 10, wherein:

said path is formed on the throttle valve surface, and is formed as at least one slit that extends across the rotating shaft.

15. The electronically controlled throttle device for the internal combustion engine according to claim 14, wherein:

in a state in which the valve is fully closed, the slit that is the airflow path is provided on an area on the upstream or downstream side, or both sides, of the valve surface.

16. The electronically controlled throttle device used for the internal combustion engine according to claim 10, wherein the airflow path is also provided on an area whose size is smaller than the quantity $\Pi \times (d/2)^2$, where d is a diameter of the shaft.

17. A butterfly valve device comprising a butterfly valve made of a resin material, said butterfly valve being rotatably supported by a rotating shaft in a fluid path, said rotating shaft being inserted into a bearing hole provided in a wall surface of the fluid path is, wherein:

cylindrical elastic sealing members are mounted around the shaft in the bearing hole, and an edge on the fluid path side of the sealing members elastically contacts an annular surface formed at a position facing the bearing hole about the rotating shaft of the valve.

18. The butterfly valve device according to claim 17, wherein:

the valve is formed in a rectangular or ellipsoidal shape having four corners, each of which has a curved surface having the specific curvature; and a sealing member of the valve peripheral lower surface in a half round portion with respect to the rotating shaft is formed with at least two areas: an area up to bearings on one side including the curved surface on one side; and an area up to the bearings on the other side including the curved surface on the other side.

19. A butterfly valve device, wherein:

when a butterfly valve is located at a full-closed position facing a peripheral lower surface of a semicircular portion with respect to a rotating shaft of the butterfly valve, a partial annular projection is adapted to radially inwardly extend towards an inner wall surface of a fluid path, the partial annular projection including a plane that contacts the peripheral lower surface of the valve to form a fluid seal; and cylindrical elastic sealing members are further mounted around the shaft in the bearing hole, and an edge on the fluid path side of the sealing members elastically contacts an annular surface formed at a position facing the bearing hole about the rotating shaft of the valve.

20. The butterfly valve device according to claim 19, wherein:

the valve is formed in a rectangular or ellipsoidal shape having four corners, each of which has a curved surface having the specific curvature; and a sealing member of the valve peripheral lower surface in a half round portion with respect to the rotating shaft is formed with at least two areas: an area up to bearings on one side including the curved surface on one side; and an area up to the bearings on the other side including the curved surface on the other side.

21. The electronically controlled throttle device for the internal combustion engine according to claim 15, wherein the throttle valve and the rotating shaft are molded as one unit.

22. A butterfly valve device comprising a butterfly valve made of a resin material, said butterfly valve being rotatably supported by a rotating shaft in a fluid path, wherein:

when the butterfly valve is located at a full-closed position facing a peripheral lower surface of the semicircular portion with respect to a rotating shaft of the butterfly valve, a partial annular projection is adapted to radially inwardly extend towards an inner wall surface of a fluid path, the partial annular projection including a plane that contacts the peripheral lower surface of the valve to form a fluid seal;

the partial annular projection is formed in a specific area ranging from a pair of bearings which support the rotating shaft of the valve to an area in a circumferential direction; and the projection, at least part of which is lacking, extends over a remaining range including a position whose distance from the pair of bearings becomes equivalent in the circumference direction, wherein within a range of the lacking part, an area between the periphery of the valve and the inner circumferential wall surface of the fluid path, which faces the periphery, is provided with a minute gap used to adjust the minimum airflow; and the leakage airflow from the minute gap between the valve peripheral surface included in the lacking part and the fluid path inner wall surface is kept substantially constant while the valve is pressed down to a seat surface, and after the valve gets away from the seat surface to open, until the specific opening is exceeded.

23. A butterfly valve device comprising a butterfly valve made of a resin material, said butterfly valve being rotatably supported by a rotating shaft in a fluid path, wherein:

when the butterfly valve is located at a full-closed position facing a peripheral lower surface of the semicircular portion with respect to a rotating shaft of the butterfly valve, a partial annular projection is adapted to radially inwardly extend towards an inner wall surface of a fluid path, the partial annular projection including a plane that contacts the peripheral lower surface of the valve to form a fluid seal;

wherein the annular projection is provided in an area ranging from a pair of bearings which support the rotating shaft of the valve to a specific area in a circumferential direction, and the remaining area is alternately formed with a projection and a projection lacking portion.

* * * * *